United States Patent
Malan et al.

(10) Patent No.: US 12,300,271 B2
(45) Date of Patent: May 13, 2025

(54) SYSTEM AND METHOD FOR DOCUMENTING RECORDED EVENTS

(71) Applicant: Parrot AI, Inc., Acton, MA (US)

(72) Inventors: Gerald Malan, Ann Arbor, MI (US); Lawrence Huston, Ann Arbor, MI (US); Ranganathan Gopalan, Wayland, MA (US); Andrew Mortensen, Ann Arbor, MI (US); Jonathan Philip Obley, Ann Arbor, MI (US); Jonathan Walters, Baltimore, MD (US); Paul Morville, Acton, MA (US); Tyler Markley, Center Harbor, NH (US)

(73) Assignee: Advisor360 LLC, Needham, MA (US)

( * ) Notice: Subject to any disclaimer, the term of this patent is extended or adjusted under 35 U.S.C. 154(b) by 0 days.

(21) Appl. No.: 18/056,972

(22) Filed: Nov. 18, 2022

(65) Prior Publication Data
US 2023/0156053 A1 May 18, 2023

Related U.S. Application Data

(60) Provisional application No. 63/280,830, filed on Nov. 18, 2021, provisional application No. 63/280,837, filed on Nov. 18, 2021.

(51) Int. Cl.
*H04L 9/32* (2006.01)
*G06F 3/0481* (2022.01)
(Continued)

(52) U.S. Cl.
CPC .......... *G11B 27/002* (2013.01); *G06F 3/0481* (2013.01); *G06F 3/0486* (2013.01);
(Continued)

(58) Field of Classification Search
CPC ... G11B 27/002; G06F 3/0481; G06F 3/0486; G06F 16/41; G06F 16/447; G06F 16/489;
(Continued)

(56) References Cited

U.S. PATENT DOCUMENTS 5,895,470 A * 4/1999 Pirolli .................. G06F 16/951
707/999.005
6,119,135 A * 9/2000 Helfman ............... G06F 16/957
707/E17.119
(Continued)

FOREIGN PATENT DOCUMENTS

EP 2741237 A1 6/2014

OTHER PUBLICATIONS

International Search Report and Written Opinion of the International Searching Authority, mailed on Apr. 17, 2023, from International Application No. PCT/US2022/080139, filed on Nov. 18, 2022. 18 pages.
(Continued)

*Primary Examiner* — Jason D Recek
*Assistant Examiner* — Golam Mahmud
(74) *Attorney, Agent, or Firm* — Goodwin Procter LLP

(57) ABSTRACT

A media presentation system ingests and stores media data for recordings (e.g., of events such as meetings, presentations, conferences) and provides short sections of media known as clips, that reference ranges of the full recording, with all clips referencing the same underlying media data stored by the system. The system also enables embedding of any number of arbitrarily sized (e.g., by time and dimensions) clips in a web page or document.

16 Claims, 37 Drawing Sheets

(51) Int. Cl.
| | |
|---|---|
| *G06F 3/0486* | (2013.01) |
| *G06F 21/10* | (2013.01) |
| *G06F 21/60* | (2013.01) |
| *G11B 27/00* | (2006.01) |
| *H04L 9/08* | (2006.01) |
| *H04L 9/14* | (2006.01) |
| *H04L 29/06* | (2006.01) |
| *H04L 65/402* | (2022.01) |
| *H04L 65/752* | (2022.01) |

(52) U.S. Cl.
CPC ............ *G06F 21/10* (2013.01); *H04L 65/402* (2022.05); *H04L 65/752* (2022.05)

(58) Field of Classification Search
CPC ...... G06F 21/10; G06F 21/6209; G06F 16/94; H04L 65/402; H04L 65/752; H04L 12/1831
See application file for complete search history.

(56) References Cited

U.S. PATENT DOCUMENTS

| | | | | |
|---|---|---|---|---|
| 6,317,777 | B1* | 11/2001 | Skarbo | G06Q 10/10 |
| | | | | 348/E7.083 |
| 7,669,127 | B2* | 2/2010 | Hull | G11B 27/28 |
| | | | | 715/720 |
| 8,266,214 | B2* | 9/2012 | Hon | G06F 16/435 |
| | | | | 709/205 |
| 8,868,637 | B2* | 10/2014 | Rosenstein | H04L 67/02 |
| | | | | 709/225 |
| 10,410,000 | B1 | 9/2019 | Ghafourifar et al. | |
| 10,936,799 | B2* | 3/2021 | Dorner | G06Q 50/01 |
| 2004/0261016 | A1* | 12/2004 | Glass | H04L 51/212 |
| | | | | 715/230 |
| 2006/0277481 | A1* | 12/2006 | Forstall | G06F 16/957 |
| | | | | 715/764 |
| 2009/0019553 | A1 | 1/2009 | Narayanaswami | |
| 2009/0025063 | A1 | 1/2009 | Thomas | |
| 2009/0089883 | A1 | 4/2009 | Martocci | |
| 2011/0153330 | A1* | 6/2011 | Yazdani | G10L 13/00 |
| | | | | 704/260 |
| 2014/0152757 | A1 | 6/2014 | Malegaonkar et al. | |
| 2017/0048275 | A1 | 2/2017 | John et al. | |
| 2019/0259377 | A1* | 8/2019 | Mertens | G06F 16/638 |

OTHER PUBLICATIONS

International Search Report and Written Opinion of the International Searching Authority, mailed on May 8, 2023, from International Application No. PCT/US2022/080137, filed on Nov. 18, 2022. 22 pages.

Invitation to Pay Additional Fees and, Where Applicable, Protest Fee and Communication Relating to the Results of the Partial International Search Report Received in International Application No. PCT/US2022/080137 mailed on Mar. 9, 2023, 20 pages.

Invitation to Pat Additional Fees and, Where Applicable, Protest Fee and Communication Relating to the Results of the Partial International Search Received in International Application No. PCT/US2022/080139 mailed on Feb. 22, 2023, 11 pages.

International Preliminary Report on Patentability, mailed on May 30, 2024, from International Application No. PCT/US2022/080137, filed on Nov. 18, 2022. 16 pages.

International Preliminary Report on Patentability, mailed on May 30, 2024, from International Application No. PCT/US2022/080139, filed on Nov. 18, 2022. 12 pages.

U.S. Appl. No. 18/056,972, filed Nov. 18, 2022.

* cited by examiner

FIG. 11B

- Your Recordings
- Shared Pages ⊕
- Team Notes
- Project Pipeline
- Daily Stand Ups
- Retros
- Randall Feedback
- Board Presentation
- All Hands
- Open Enrollment
- Untitled
- Untitled
- Thanks JP
- Private Pages ⊕
- Architecture Discussio...
- Test Page
- Merix Design Meetings
- Engineering Standups
- Planning for PI-4

<< Collapse sidebar

220 rmalan@retro.video

92

242

224

90

Private / Document to paste Clips
Document to paste Clips

94

214 spk_0  A There's
spk_1  an automobile caught on the heaving road way. The 11,000 ton center span twists and strains of giant tables have supported tables of 6300 wire strands each 17 inches six.
spk_0  A back
spk_1  out of the danger zone. All stricken Spectators are driven to safety as a bridge gyrates like a nightmare. High above the river, twisting, turning,
spk_0  curling. A The
spk_1  long motorist is forced to abandon the car. He has been a few minutes in which to save himself —228T
spk_0  face
spk_1  to face with fate, His destiny hanging in the balance,

212D

```
1  {
2    "document":
       "H4sIAAAAAAAA+1YbYgkRxnunp7dvds9NntJwBU8U3K34X5MDzOzs7MzSCDRJHKQSMKpf0N1d/VMmf667qr7lePANZdbkyCBjRL8IckpiSG3oH9i7gIBV4S9+AUnoBGIX6JCoojmn
        4d661tFpbM3e0HJD6MEIp2e6vp43+d53qeqZtaSeuXIr99g7f7tGz9/6tAbh3/wuysvTVoWQznuJ/jbDBjqQ7TVfVgT2U858Wq7G/29oyfJowkzLaemdpUjXtGy6Znp2C4fPr21Id
        PJAhH9BTHmeIRy6IPcpQGNK1tyB7fn9qZz8qn30+fs31RR3emCfER6RMm/hUMFyjcvnjzyRyedVsNRbTPI4ygG60JTwOeMATR9Tmpoq0nlCQoxjynhV6xwsJDEIFWQxRepRHMQwmSk
        cl/hmvA6khF9ueZLWdT5zOZ48NzJsdzc485d5CE4GQ0Vw15EU4cyhBnJpiCBDUIICE3ZhBUkQYYQkAbxXEdfU4E4/GtxyjjOZAmOEcJjyA/rD9JRGhIkkchSvgdfVq2x2IWjgMsgwd
        UPJKnNYQZirjPOACw30w5oxR1uYcgjocUihggok4SGxiEcAwkgcQBE1ojBiJYvwNlmAi4s/zgqV6WxgJyDIRiYgsBknAqjjwBB/ZAOeE5djgrwMBAEzOQ8owMCDQOINFKQFihjzKO
        MoMojiIIRzaRoqAAORWR59IJpg096kE14jRaADIScsnrLGp6zmkbGveuPbE/GxnvgeuSBTBIkmaqNwQ4AN/dTR6N5IWRjxPgAzQZj5IEynI07IqF1P6RMM04izDIg0yoL4QJ10ziDY
        QnIZbgJD4ggigFh4UsnV0hy6TE08xtajIVFX4PC/E6KciCF3XAUh/iMUsgBiScosQQrAjgEMFKBHhAmHoVhBYhqGAU8h0vosAe8AL5BqnuUfHgC4gDqUIBgDoh5HwQpgakvQR43lGy
        xKto5O8yIAYwHRkbLacsIyIRUwEQi1xU+wTAsr5KGINsips6KyzxQjzm1Cs+d6an+T7jc0G7zcPv27fD9NIPhyfxwUuq4YU5z6vjdMKBZMWIzhVwShTwki6OuhVx6H1pyiBBK1s07W
        U6pRFrSMakPEac9PuqBMNCe9TLOQWkVTXiqclnUBV1tG9qqCEdETigouIMqsXbnrB3tFmpQvAtp5w7pbPz01vvTQKqFPnJPfz87J71VhLJ/SJj6X5gHJSXAPsKTx21h0DsAa7AT4g
        G760uIkzA8tGpjPLq7fk+bgJzqPRLZpBPheIz2fAe2AekBBKcBghwlLFmJmAEhe5gpeAtkPSS5shJZWBMgYmgTdBRR0GRvL/vvidvW4Cx4K0M2ZfcbeNKFfm83zRyazuXDEZLN95NW
        Kon1P4D5KqDeQLJemCSTIijmlpRpQbYHkJUpeBF7GaacLBeovxwQKy2xayqcJ034nEhzFrncwMm7hoQAjbsmYJeQ1Uz1Knxh8VyjcrxmBwsYndxMjakIVqmIKhJRCj/EERotGqQfP1
        vC7VCx9rPS69XOSsR216fSoqXaRwYK6Xmert7yK3tDUZ8bb2gLhzzT4UVHp3g7eLRSd4uHTW8vXT0gqOS0RUese+qmY2zVKQqd0hNAWxEhSATAMLywWwEarcKwWogBLDLU3hkK73
        +OvJOMNTR3GMgirIlPnSSx1g6Xz7CTaI/OZY47jtxtTuhs7Wt1qbosn9PePrROgRCP16aROgnSwahny41FIdgRQMtj+DPsNsLWdfGWDHnDaHL+nGzVBnc7rjbvH2zM+tFqf/gKZ4yo
        hf85z5BFPFWE8TgrVuoEmGEwTRgRCoCIjIEV+6jCVHBkDRbUWWm4oBlfbQqupyCLBHWUlc94XQHiub1EWevH2k7h3qocbMm62PEGWXUrne1E5o27Zrz8ex5Sw9RwsnvMWdxaDgpHd
        BgnI7KSNkapjARNBoSFr11sTVSqGoKkeNn5HFnKIqdVglbQTaFZQtaxIDGuC9u30wilM9rdt/ff3sxT1Lncjfuvm7NhLgQiGI4zsrT/KQQZ4zqzxkqOmznMZUOk1ZTxK7M6dRnroGz
        GnBQcgTh7UFxYmhcnHtqvFeJ3GglfhtrhOT70n6MtA6TW61GnykcvffO1Ps9auusbo+8zhOBW16EqJHrdUI2oK2dvrH9NFZ1Wfz5B1zpu2mZgAESeCsmE6w30c380c80XKc5/cK4d
        C+9qxBmmuLveax0OvIbbnhtN9cnFTcMSCvs+w3SIGOz+pAafZ+ac+1Y08sr/krqdlvE77nt5ZW26+Fw2SXtcCxs41B4pGnGHsjx2klVipZpm4a2u5LAPn37mRdP/uVnv/yQeXFws
        InuffR2267c//bDH710Sz21d2rUJ56/LfwL22NshuaZoflylV/Viq76txEvVG13/Auec/sxxthHG/T5T3BuFae4FzvY86F68G58C5wLkzCwb4xv1o71vJ7EESj63zxEEBKqC/Fnhe
        hYqMzD1RqKTZxH1sFe4PIGuyEbiM0M7nFrNIrgKg1HCk/cJYbicjflgYe96AvQFILLQ2exURIfOBczpVDMdfuPb331YPwjjpZjTC78up3XntyxtrRpw3Ijz9Mn7d/KNufftnXDDNg
        MeKx38PGnHtqdtpQMF/b5WU9h81HPthfdv5f7wP/a4a9qs5i5HmmPOoazx5wPSHt/kfaoz2wjpWtwPva9aesvv9yYqyi6NvsVi7z2svS95/PKOyx1T1R/n7wfSq1zufWp4IFcrCjwij
        8jbevkDpzml12tCTTJg71kytdHPPipJc6yMStwy+00mdvCuTS8TOnoMASV1ad//cgjFUtYM6/ua2q3nPQe3XfFb3w6IXGbLThqtnt+w+0Fkzz30+sue2EnbDcay6r3of9oK53/L26
        16jZ2wHp2amdq235nZsv53sk2zVVK8ubl1f/ccs157fHGk8uLUsR2JaJyKs4c9ubffGzzDV5txb2I/wtota3+KRqAAA==" ,
3    "created_at": "2021-09-10T15:40:44.321Z" ,
4    "created_by": "0eb22b8b-bc3b-4ef0-8776-3ea8127bfe91" ,
5    "title": " dogscat dogscatscat dogscatscat scat" ,
6    "token":
       "eyJrawQi0iJhbG1hcy9kZXYtbXBkLwt1eTE1LCJhbGciOiJSUzI1NiJ9.eyJpc3Mi0iJodHRwczovL2FwaS5yZXRyby9bY1kZXVuY2xvdWQvdjFFcGFnZnS84MTY0GViMClhoTcyLTQ2
        MTctYTA4Yy1jOTZkMTJiNTcxNjIiLCJpYXQi0iE2MzQ5MzA2NjosImv4cCI6MTY2NDkzMDY5NCwiC3ViIjoiMGViMjjiOGItYmMzYi00ZWYwLTg3NzYtM2VhODEyN2JmZTkxIiwid2
        tzcCI6Tjg4NzRiNGzmLTU1ZTIENDZ1Yi05MTI4LTU5MjI4YwY1MDhhYSIsInBhZ2Ui0iI4MTY0NGViMClhoTcyLTQ2MTctYTA4Yy1jOTZkMTJiNTcxNjIiLCJwZXJtJjoiYWRtaW4s
        ZWRpdCx2aWV3In0.e2LoQY_HJ9Uydzkdzkd0qsypx-
        cGeuO1lUGrTKiKiYpQV_5eDfnb5h2c28viooB5nPUr24GfzLdRnj_PXcyNK6xU3JOHyiwTr9IN_cWWcs3GjpXnFHHIjzko9JqmINuu86s2j1uZTwYnZ187m_a0enb6yotf4LB5FPy
        XyFyxdepE7HnBSVCFIATAzTVukdsqp8g_4Kpxx1yy2qeca5Adp7No4pCQXMPbCwjW5Z1manInq261fXwdudyqo5pga-
        srkqq2v9270ffx4mgpk01cU0ioj_19Z5_M9xWk1b2D1mXDGwxfQB92WmuQlDcg6Okycr0Ar_wpeTIvn8lqeTQTkqaA"
7    "updated_at": "2021-09-10T15:40:44.321Z"
8  }
```

FIG. 13

```
1  {
2      "type": "thread",
3      "content": [                              150P
4          {
5              "type": "paragraph",
6              "content": [
7                  {
8                      "type": "text",
9                      "text": "asdfasdfasdfasdf",
10                 }
11             ]
12         },
13         {
14             "type": "paragraph"
15         },
16         {
17             "type": "paragraph",
18             "content": [
19                 {
20                     "type": "text",
21                     "text":  "so is this saving?"
22                 }
23             ]
24         },
25         {
26             "type": "paragraph",
27             "content": [
28                 {
29                     "type":          ,
30                     "attrs": {
31                         "open": false,
32                         "mediaId": "90373804-22ed-4c3f-a653-2c4e413e95f7",
33                         "id": "f6921b0d-043c-4b1b-a583-49bd7f3e0f3f" ,
34                         "pageId": "4fa7c5d4-2ec9-4354-baf3-e4f5f6adebe1",
35                                  :  "90373804-22ed-4c3f-a653-2c4e413e95f7",
36                         "sourcepageId": "0eb22b8b-bc3b-4ef0-8776-3ea8127bfe91",
37                         "rawStart": 0,
38                         "rawEnd": 1032.133,
39                         "viewStart": 21.99,
40                         "viewEnd": 59.71,
41                     }
42                 }
43             ]
44         },
45         {
46             "type": "heading",
47             "attrs": {
48                 "level": 3
49             },
50             "content": [
51                 {
52                     "type": "text",
53                     "text": "maybe? I mean, things are... happeningdasdfasdfasdfasdfasdfasdfasd"
54                 }
55             ]
56         }
57     ]
58 }
```

Today ∨

Collapse ↑

FIG. 14

250 ─ [🔍 in: Bridge Highlights | the| ]    ⊙ | ⊛ rmalan@retro.video ⌄ ── 242

≡ ⌄ | B I U S | ≡ ≡ ≡ | ⋮≡ ⋮≡ ≡ '≡ ≡ | — | ↵

Private / Bridge Highlights

Bridge Highlights

[The] first highlight

⊙ ⌄ 🔍
   spk_1  a dawn

212D ── spk_0  of a fatal day and [the] wind begins to speak
                with a roar that no man ── 228T
              ↘ matches within transcript
                   text highlighted
   spk_1  hear.

↙ matches within page
          contents highlighted ── 150U

[The] second highlight

⊙ ⌄ 🔍
212D ── spk_0  Engineers are divided as to [the] cause of [the] disaster. Some claim it was [the] ── 228T
                use of solid girders. Others differ, but whatever [the] reason Tacoma will
                rebuild this time. A bridge that will not provide a super thrill in [the] news

Patents ›
⊙ Your Recordings
🔖 Shared Pages ⊕
🔖 Private Pages ⊕

<< Collapse sidebar

FIG. 21

○ ○ ○ | R Bridge Moments | Retro × | + |
← → C | 🔒 [URL]
⊞ Apps ⊡ ca ⊠ ma ⊘ dr ⊡ me ⊗ fi ⊘ sk 🔲 in ⊗ co ⊘ ji ⊘ op ⊘ ou ⊘ ... ◇ ⊚ ♤ ⊕ ® ❯
                                                                    ⓓ | 🖽 Reading List
                                                                    ⓡ rmalan@retro.video

Patents                                        ⎡ 4/9  ⎤ ⓠ ⓠ  ⌃ ⌄ ⓘ ✕
                            ╭─────────╮            │ the  │
                   262 ─── │ 🔍 Search │            ╰──────╯
                            ╰─────────╯
◎ Your Recordings     ❯     ≡ ▾ | B *I* U̲ | ≣ ≡ ≡ | ≣ ≝ ≝ | − | ↵ ↑
                                                                        ─ 242
🗎 Shared Pages  ⊕          Private / Bridge Highlights           ─ 250B
🔒 Private Pages ⊕
                            Bridge Highlights
                                                             [○]
                            The first highlight
                            ⊘ ⌄ ⓡ
                              spk_1  a dawn
                    212D ── spk_0  of a fatal day and the wind begins to speak
                                        with a roar that no man ── 228T
                              spk_1  hear.

The second highlight ── 150U
                            ⊘ ⌄ ⓡ
                    212D ── spk_0  Engineers are divided as to the cause of the disaster. Some claim it
                                        was the use of solid girders. Others differ, but whatever the reason
                                        Tacoma will rebuild this time. A bridge that will not provide a super
                                        thrill in the news              ── 228T << Collapse sidebar

SYSTEM AND METHOD FOR DOCUMENTING RECORDED EVENTS

RELATED APPLICATIONS

This application claims the benefit under 35 USC 119(e) of U.S. Provisional Application No. 63/280,830, filed on Nov. 18, 2021, and 63/280,837, filed on Nov. 18, 2021, both of which are incorporated herein by reference in their entirety.

This application is related to U.S. patent application Ser. No. 18/056,978, filed on an even date herewith, entitled "System and method for access control, group ownership, and redaction of recordings of events," and sharing inventors herewith, which is incorporated herein by reference in its entirety.

BACKGROUND OF THE INVENTION

Video conferencing technology uses audio, video, and video and static media streaming to allow users who are located in different places to communicate with each other in real time and hold on-line meetings in a variety of contexts, including business, government, education, and personal relationships, to name a few examples. In a typical implementation, audio and/or video capture devices (e.g., microphones and cameras connected to or built into user devices such as desktop computers, laptop computers, smart phones, tablets, mobile phones, and/or telephones) capture audio containing speech of users or groups of users at each location and video visually depicting the users or groups of users and the user devices distribute static images and/or video that is being presented by and for the users. The audio and video data from each location is possibly combined and streamed to other participants of the meeting and can even be recorded and stored (e.g., as a media file) that can later be accessed directly or streamed, for example, to non-participants of the meeting seeking to find out what was discussed or participants of the meeting seeking to engage with the contents of the meeting after the fact.

At the same time, productivity client and cloud-based platforms such as word processing, presentation, publication, and note-taking programs exist for inputting, editing, formatting, and outputting text and still images. These are increasingly implemented in an online or hybrid online/desktop context (e.g., as a web application presented in a web browser, or as a desktop application or mobile app connected to a cloud-based platform), allowing for sharing and collaboration of the same document and files between multiple users. Notable examples include Microsoft Word and its related productivity programs included in the Microsoft Office 365 productivity suite developed by Microsoft Corporation and Google Docs and its related productivity programs included in the G Suite or Google Drive platforms developed by Alphabet Inc. Similarly, hypertext publication platforms such as wikis present, typically in a web browser, text and still images while also allowing collaboration between users in inputting, editing, formatting, and outputting the published content, often using a simplified markup language in combination with hypertext markup language (HTML).

SUMMARY OF THE INVENTION

Existing productivity and hypertext publication platforms do not effectively deal with audio and video and other time-indexed media. In general, time-indexed media often combines audio, video, graphics, images and/or text information with a durational or temporal dimension such that the media is created, presented, and experienced over a period of time. Common examples include audio and video media, but can also incorporate written textual and graphic information (e.g., slides or screenshares displayed simultaneously with a spoken presentation).

For example, all major client and cloud services that provide document editing as a feature almost universally handle time-indexed media using pointers or links to monolithic media objects such as files. Often, these media objects can only be referenced in a page or document as a thumbnail screenshot from the original recording or an opaque hyperlink to a media object (e.g., mp4) or location within the object's file. These services do not treat contents of time-indexed media, including other information such as the speakers, words, and transcripts, as part of the page or document but rather as opaque attributes of the recording that can only be accessed by an external media player that is launched when a user clicks on the thumbnail or link.

In general, processing media (e.g., transcoding and text extraction) is computationally expensive and has high latency. Moreover, naïvely implemented systems for media sharing would require copying shared media data into a new document or page, and this duplication is problematic due to the cost of storage and management and does not address problems such as propagating changes or even deletion of the shared media across all of the copies.

The presently disclosed productivity and media presentation system ingests and stores time-indexed media data of recordings (e.g., of events such as classes, meetings, presentations, conferences, existing video) and presentations and provides the ability to reference short sections of the media, termed clips, as ranges within the full recording. All clips based on full recording, reference the same underlying media data stored by the system but for different timestamp ranges. The system also enables users to selectively display different associated layers such as text (transcript), presentation slides and/or screenshares, comments, chat, annotations (including actions items and commenting), and/or metadata layers of the time-indexed media, for example embedding any number of arbitrarily sized (e.g., by time and dimensions) clips in a web page or other document, by treating the full recordings as first-class objects and treating all dimensions of the time-indexed media content for the embedded clips as first-class pieces of the page or document that are storable, searchable, and secure.

When creating a clip, the presently disclosed system enables selection (e.g., by a user) of a range of time-indexed content in a recording (such as by selecting words from transcripts, slides, video frames, screenshares, based on metadata etc.), looks up the time ranges of these elements, and creates a new clip object referencing individual or all of the layers for that time range. In one example, the selection is detected in the form of a portion of transcript text being highlighted by the user. However, selectors for any of the layers can be employed as a mechanism for delimiting the desired extent of the clip. In addition, clips can comprise all of the streams or layers or only a subset of the layers. In one example, the system enables selection of which particular layers of media data should be copied and/or referenced by a clip. In another example, a transcript-text-based selector is used to determine a time range for a portion of the recording referenced by a new clip that nevertheless, based on user-specified parameters, does not present the transcript text and only presents an audio layer for the referenced portion of the recording.

All parts of the clip objects are stored with the page in which they are embedded, and by having the ability to view and access the web document or page, a user would be able to access any part of the embedded clip, including any of the multiple time-indexed content layers including for audio, video, text, graphics, screenshares and/or metadata content, including transcripts, translations, speakers, and tags, among other examples. When a web document or page with embedded clips is searched, any piece in any layer of any embedded clip matching the search will be found and represented in the results, unless the layer is excluded based on user-specified search parameters. In one example, a search of a keyword that matches a transcript or meeting participant pertaining to a portion of time-indexed media embedded in a document or page would be presented as a result of the search.

Additionally, multiple time-indexed content layers (e.g., audio, video, transcripts, translations, annotations, chats, comments, identified speakers, tags) that are associated with the same event can be combined into a single overarching reference object. For example, multiple simultaneous recordings with video feeds of various participants, including multiple screenshares, can take place during a single meeting, and transcripts of the meeting can be generated in multiple languages. All of these can be combined so as to be referenced by a single recording object that can in turn be referenced in a page or document as a first-class object.

In this way, the presently disclosed productivity and media presentation system provides a system/method for documenting events such as classes, meetings, presentations, conferences, using existing video that makes adding, editing, and sharing time-indexed media content in a shared document or page editor easy and intuitive for the user or users in a manner similar to selecting, copying, and pasting plain text.

Moreover, the applicability of the present system and its associated methods extends far beyond the traditional multi-participant video conference. It can be used as a note taking and documentation tool for students. It can be used on an individual basis to capture and document thoughts from a personal dialog. In the domain of medical care, it can be used to document patient meetings/appointments. It can facilitate asynchronous meetings where the participants do not attend the meeting necessarily at same time. Different participants make their respective contributions, audio/video presentations along with notes and agendas, to construct a synthetic, asynchronous meeting and facilitate consensus.

At the same time, the presently disclosed system can minimize the amount of media processing required once a recording is ingested, as shared portions of full recordings are all handled as references to the same underlying stored media data. Thus, any newly generated and embedded clips are immediately accessible, with no additional media processing required. Additionally, because different clips all share the same underlying media files and thus can all be accessed through the same backing store, these files can be delivered efficiently through a content delivery network (CDN). Thus, efficiency is a key advantage provided by the present system.

Additionally, the presently disclosed media presentation system allows users to tag portions of the media data, for example, to identify meeting participants or other individuals pertaining to the recording such as an author, creator, speaker, or anyone who was active. In this way, it is possible to search not just for what was said in a recording but for people as well.

More generally, all contents of embedded clips are treated as part of the pages in which the clips are embedded for the purposes of searching.

In general, according to one aspect, the invention features a system and method for documenting meetings. A graphical user interface enables users to author content and to embed reference data defining referenced portions of time-indexed content from the meetings, and the system further enables users to selectively display text (transcript), presentation slide, and/or metadata layers of the time-indexed content corresponding to the referenced portions.

In general, according to another aspect, the invention features a system and method for documenting meetings. A graphical user interface (GUI) implements a page editor for presenting and editing the pages. The GUI also displays transcript text for recordings of the meetings based on a transcript text layer of the recordings. In response to detecting, via the GUI, user input indicating insertion of user-selected portions of the displayed transcript text into the pages via the page editor, reference data is generated defining referenced portions of time-indexed content from the meetings delineated by the user-selected portions of the displayed transcript text and embedding the reference data into the pages.

In embodiments, detecting the user input indicating the insertion of the user-selected portions of the transcript text includes detecting predetermined keyboard sequences and/or pop up menu selections for copying a highlighted portion of the displayed transcript text and pasting the copied text into the page editor and/or detecting an input sequence for dragging and dropping a highlighted portion of the displayed transcript text into the page editor.

In general, according to another aspect, the invention features a system and method for documenting meetings. A graphical user interface (GUI) implements a page editor for presenting and editing the pages. The GUI also displays presentation slides for recordings of the meetings based on a presentation slide layer of the recordings. In response to detecting, via the GUI, user input indicating insertion of selected ones of the presentation slides into the pages via the page editor, the system generates reference data defining referenced portions of time-indexed content from the meetings delineated by the user-selected presentation slides and embeds the reference data into the pages.

In general, according to another aspect, the invention features a system and method for documenting meetings. A graphical user interface (GUI) implements a page editor for presenting and editing the pages. The GUI also implements a time range selector for selecting portions of recordings of meetings. In response to detecting, via the GUI, user definition of portions of the meeting via the time range selector, the system generates reference data defining referenced portions of time-indexed content from the meetings delineated by the time range selector and embeds the reference data into the pages.

In general, according to another aspect, the invention features a system and method for documenting meetings. A graphical user interface (GUI) implements a page editor for presenting and editing pages including embedded clip reference data defining referenced portions of time-indexed content from the meetings. A search interface for receiving user entered search terms is also provided. The system searches for matches to the search terms by searching for the matches in user-authored content of the pages and within text layers of the referenced portions, and presents search results including the user-authored content matching the search terms and with the text layers of the references portions.

In general, according to another aspect, the invention features a system and method for documenting meetings. Time-based media data for recordings of events is stored in a data store along with ownership information indicating one or more owners for each of the recordings. Recording objects representing the recordings contain the stored time-based media data for the recordings, while clip objects representing portions of the recordings each include reference data identifying a recording object and defining a referenced portion of the stored time-indexed content for the identified recording object.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 11A-11C show exemplary page editor screens of the GUI;

FIGS. 12-16 show exemplary iterations of page data for a page with embedded clips in its various forms as the page data is retrieved, parsed, and presented by the user app;

FIGS. 18-23 show exemplary page editor screens of the GUI, showing various iterations of the screens at different stages of the searching process;

FIG. 31 shows an exemplary page editor screen of the GUI with the annotation layer pane and specifically a comment in the annotations layer that is associated with a delineated portion of the transcript and then the time-indexed data.

DETAILED DESCRIPTION OF THE PREFERRED EMBODIMENTS

Figure 1A:
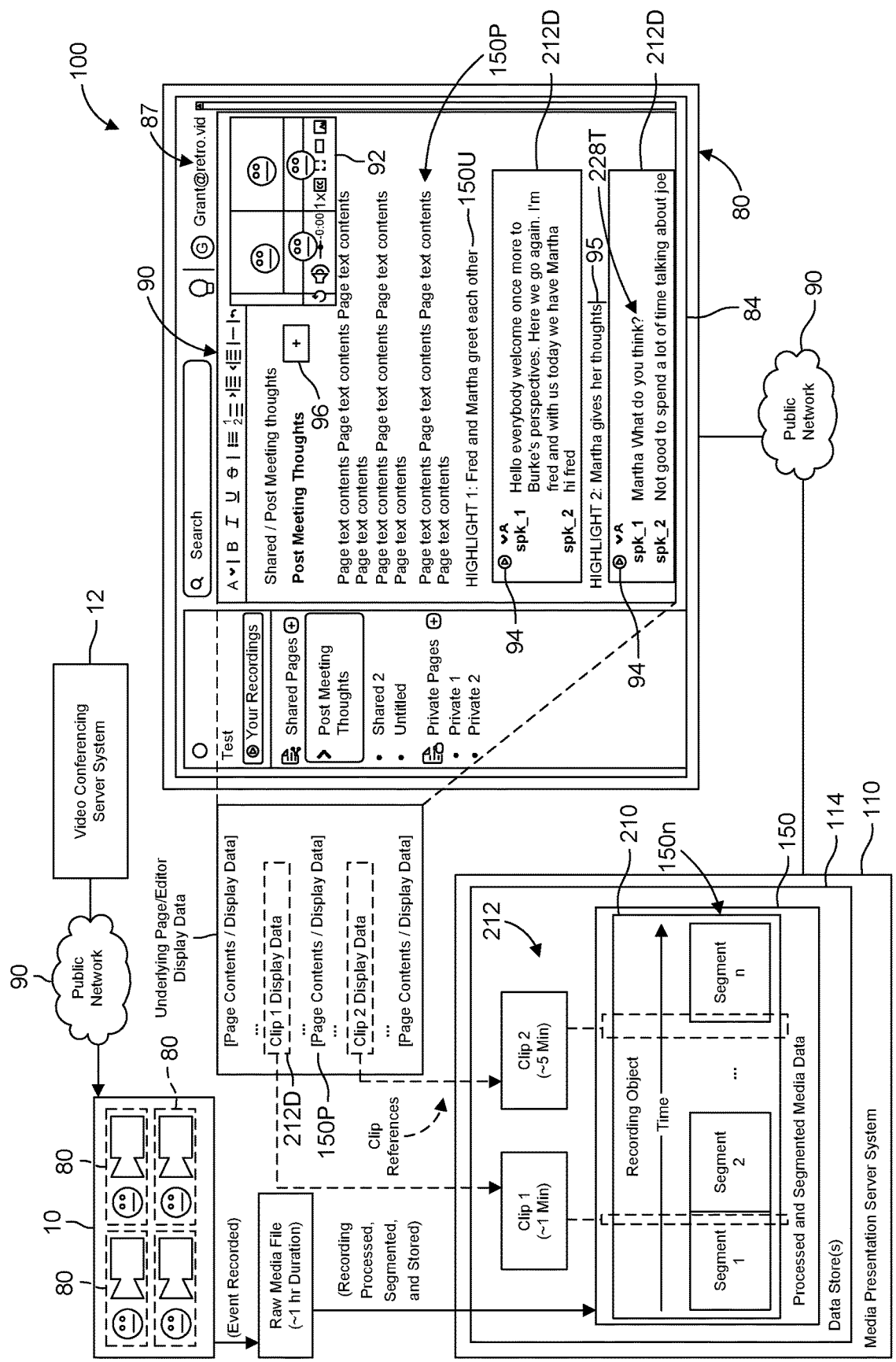
FIG. 1A is schematic diagram of an exemplary video conferencing, productivity and media presentation system according to an embodiment of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, the present invention relates to a video conferencing, productivity and media presentation system 100 for hosting or working with hosted or recorded or previously recorded events such as video conferences, classes, lectures, meetings, presentations, conferences, asynchronous meetings, and monologues and generating, presenting, editing, and sharing time-indexed media with other authored content such as audio and/or video recordings of the events and content layers (e.g., audio, video, transcripts, translations, annotations, chats, comments, identified speakers, tags). These events can occur in a variety of contexts, including business, government, education, and in personal relationships, to name a few examples. In examples, the video conferencing, productivity and media presentation system 100 provides video conferencing and hypertext publication platform and/or productivity platform enabling collaboration by a plurality of users in video conferencing and viewing, inputting, editing, formatting, and outputting user-authored content such as text and still images and slides typically for documenting events along with the shared time-indexed media of the events.

FIG. 1A is schematic diagram of an exemplary video conferencing, productivity and media presentation system 100 according to one embodiment of the present invention.

In one example, the video conference meeting 10 is hosted by a video conferencing server system 12. As is the case with many presently-available platforms such as Google Meet offered by Alphabet Inc., Zoom offered by Zoom Video Communications, Inc., and Microsoft Teams offered by Microsoft Corporation, the video conferencing server system 12 receives real-time audio and/or video and presentations from the user devices 80 of each of the meeting participants and distributes the audio/video and/or presentations to the user devices of the other participants. The audio/video and/or presentations are displayed on the user devices, often in windows or full screen presentations in which the participants are shown in panes, with other panes being dedicated to shared presentations, often in a screen or presentation sharing arrangement.

Also provided is a productivity and media presentation server system 110. It receives and stores time-indexed media 150 in data store(s) 114. In a common use-case, this time-indexed media is the audio/video/presentations associated events such as video conferences for meetings hosted by the video conferencing server system 12. This media presentation system itself is capable of serving documents and streaming the stored time-indexed media to the user devices 80, which present the documents and streaming time-indexed media to users of the user devices via graphical user interfaces 87 rendered on displays 84 of the user devices 80.

Typically, the time-indexed media 150 is a current or previous recording of an event such as a virtual meeting or video conference 10 but can be any type of audio and/or video data and/or any type of digital media with a temporal dimension of any duration of any type of event.

In the illustrated example, the event 10 is a virtual meeting with four different participants at four different locations conducted using video and/or audio capture devices (e.g., cameras and microphones connected to or included as internal components of user devices 80 such as desktop computers, laptop computers, smart phones, tablets, mobile phones, and/or telephones) deployed at each of the often different locations. The video and/or audio capture devices capture audio depicting speech of participants or groups of participants at each location and video visually depicting the users or groups of users. In addition to being served and distributed to be presented in real time to the different participants (and/or possibly other participants that are not depicted) on their respective user devices 80 by the video conferencing server system 12, a combined stream of the audio and video data or separate streams from each location/user device 80 are also recorded as raw media files by the media presentation server system 110 or later uploaded to the system 110. These media files of time-indexed data are then combined into documents displayed by page editors 90 that allows for the manipulation of the media files and creation of reference to the media files and additional layers and authoring of addition associated user-authored content 150U such as plain text, formatted text, still images, tables, charts, bulleted lists, and/or other display elements.

The media presentation server system 110 ingests and processes the audio and/or video streams from each of the users devices directly or indirectly via the video conferencing server system 12 and records or stores those streams, generally partitioning the meeting's media data 150 into a number of segments 150n (e.g., segmented media files) contained by a recording object 210 representing the full recording (e.g., the entire span of the originally ingested recording), and stores the segmented media data 150 in the data store(s) 114 along with clip data or clip objects 212 representing particular portions of the full recording. The clips 212 include recording references (e.g., start/stop times) delineating the extent of the clips with respect to the full recording object 210 and also specific layers of the recording object. In the current example, the clips 212 refer to the specific segments 150n of the full recording object 210 that the recording was chunked into.

In the illustrated example, the event was represented and displayed on the user devices 80 in realtime as part of the video conference 10. The productivity and media presentation server system 100 also saves and serves a recording of the meeting. A recording object 210 representing this hour-long, for example, recording and containing the many segmented media files 150n for the recording is stored along with two user-defined clip objects 212, clip 1 and clip 2.

The first clip object "clip 1" represents a portion of the full recording 210 with a duration of approximately one minute and, accordingly, includes a recording reference defining the one-minute span with respect to the duration of the full recording. Similarly, the second clip object "clip 2" represents a portion of the full recording with a duration of approximately 5 minutes and, accordingly, includes a recording reference defining the five-minute span with respect to the duration of the full recording 210. These respective clips are typically user defined references for the portions of the full recording that were of interest to the users and created using the page editor 90.

In the arbitrary illustrated example, while the underlying stored media data corresponding to the portion of the recording represented by the first clip is entirely contained within one of the segmented media files, the underlying stored media data corresponding to the portion of the recording represented by the second clip spans across more than one of the segmented media files.

In general, the segmented media data 150 generated and maintained by the productivity and media presentation server system 110 is time-indexed, comprising a recording with a temporal or time-based dimension (e.g., corresponding to the duration of the recording and the duration of the recorded event) and media content for different points along the temporal dimension. In turn, the time-indexed media data has layers corresponding to the various different types of media content and metadata, such as video, audio, transcript text, translation text, presentation slides, meeting chats, screenshares, metadata, user-specified and/or automatically generated tags, user information (e.g., identifying current speakers and/or participants depicted visually), and/or user-specified notes, comments, and/or action items associated with different points along the temporal dimension. The layers can further include separate audio and video streams generated by each of the user devices 80 in the meeting. In general, the layers of the processed and segmented time-indexed media data stack or align with each other along the temporal dimension such that the media content provided on each of the different layers have a common time-index with respect to the same points in time along the temporal dimension.

The time-indexed media data 150 stored by the productivity and media presentation system 100 preferably comprises several layers of different types of time-indexed content (e.g., video, audio, transcript text, translation text, presentation slides, metadata, user-specified and/or automatically generated tags, user information, and/or user-specified notes, comments, automations and/or action items) and/or of similar types (e.g., multiple different video or audio layers). In one example, multiple video layers of the media data are stored, each correspond to different encodings of essentially the same video stream. Similarly, multiple audio layers of the media data each correspond to different encodings of essentially the same audio stream. On the other hand, multiple layers of the media data can also each correspond to distinct content streams that are nevertheless indexed and synchronized by the temporal dimension such that the different layers for the different types of content depict the same recorded event, at the same points in time along the duration of the recording, but from different aspects.

For example, the time-indexed media data comprises multiple video or audio layers, each video layer corresponding to streams captured by different video and/or audio capture devices at different locations. Here in this example, one video layer provides media data captured by one video capture device at one location visually depicting one participant, while other video layers provide video content captured by other video capture devices at different locations visually depicting other participants. Still other video layers include video streams depicting a screenshare session that occurred during the recorded event.

The time-indexed media data also usually includes several audio layers corresponding to each of the different video layers providing audio data captured by audio capture devices at the respective locations and depicting the speech of the respective speakers that are often visually depicted in the video layers. Thus, the different video or audio layers are typically associated with particular individuals, and text and/or metadata layers then define an association between the different audio and/or video layers depicting different individuals with different users of the media presentation system.

In other cases, the video and audio of the several participants is a combined audio and video provided by the video conferencing system 12 in which the video of the separate participants is displayed in different panes of each video frame.

These text and/or metadata layers often also are associated with different users depicted within the same audio and/or video layers by referencing different points of time along the temporal dimension for which the defined associations (e.g., tags) are applicable. The text and/or metadata layers also preferably include time-indexed information concerning user permissions, ownership, and/or access rights specified in permissions data stored by the system, including information associating users with various roles with respect to portions of the recording defined via time information specified for each association indicated in the layer of the media data. In one example, the stored permissions data establishes that users tagged via a text/metadata layer of the media data as having the role of "speaker" with respect to a recording or portions of a recording (such as an individual that is depicted speaking at certain points in the audio and video layers or an individual that is considered a featured speaker for a portion of the recording in which other individuals also are depicted speaking, among other examples) should have edit and/or redaction rights for the portions within which they are tagged as a speaker.

Moreover, in addition to the layers discussed above, the time-indexed media data also typically includes layers for presentation content, including presentation slides showing different slides (e.g., of a PowerPoint slideshow or Slides from a G-Suite presentation) that were displayed during the recorded event at different points in time. Here, while one video layer visually depicts a presenter speaking, and one audio layer depicts the speech sounds from that presenter, a presentation slide or screenshare layer includes time-indexed content for depicting the different slides (e.g., visually depicting the slides or portions of the slides via image data and/or providing actual text and/or formatting from the slides) or screenshare images or video along with timestamps specifying ranges of time for which the slides or screenshare images or video are applicable (e.g., corresponding to times when the slides were displayed during the event).

In any event, because the clips 212 include the recording references (e.g., start/stop times) delineating the extent of the clips with respect to the duration of the full recording 210, and because the layers of the time-indexed media data stack or align with each other along the temporal dimension such that the content provided on each of the different layers are indicated with respect to the same points in time along the temporal dimension, any clips referencing a portion of the recording potentially encompasses all layers of the time-indexed media data within the time period or a subset of the layers as specified by the clip 212.

In addition to generally presenting streaming media content of the recordings, the user device 80, via the graphical user interface 87 rendered on its display 84, enables users to author content (e.g., static content that is not time-indexed), for example, using a page editor 90 (e.g., word processing web app, wiki platform) for inputting, editing, formatting, and outputting pages 150P containing the user-authored content 150U such as plain text, formatted text, still images, tables, charts, bulleted lists, and/or other display elements. The pages 150P are viewed, created and/or edited by one or more users via the page editors 90 of one or more user devices, particularly via interface elements of the page editor 90 such as a text input box, a text formatting toolbar, and a cursor 95 indicating a current position for any incoming text input received by the user device such as via a keyboard.

Along with the user-authored content, the media presentation system enables users to embed clip data defining referenced portions of time-indexed content from an event (e.g., the recording and its associated time-indexed media data stored in the data store). In one embodiment, the media presentation system includes a user app 85 executing on the user devices 80. This user app 85 has a graphical user interface (GUI) 87 that includes a page editor 90 that enables the embedding of clip objects 212 representing the referenced portions of the time-indexed recording objects 210 into user-authorized multimedia documents 150P.

In more detail, the embedded clip objects or clips 212 are displayed by the page editor 90 via clip display elements 212D, which reference content derived from the stored time-indexed media data (e.g., transcript text 228T) pertaining to the referenced portion of the recording and a clip play button 94, among other examples. These clip display elements 212D are rendered based on underlying page data for the displayed page, which includes the user-authored content itself (e.g., context-specific text entered by users) along with display data indicated via one or more markup languages (e.g., HTML and/or other wiki-related markup languages). Inserted into the underlying page data for the displayed page is are clips 212 that are displayed as clip display data 212D for rendering the display elements of the embedded clips. The clip display data 212D includes clip references, which are references to relevant clip data 212 and/or portions of the time-indexed media data 210 stored in the data store(s) 114 of the server system 110 (e.g., transcript text 228T within the portion of the recording defined by the recording reference of the clip). In general, when initially loading a page to be displayed, the user device 80 first retrieves the page data 150P for the page to be displayed and then retrieves relevant content derived from the time-indexed media data 210 based on any clip reference data of clip 212 contained in the page data.

Clip display elements 212D for embedded pages are generally formatted the same way as the user-authored content of the page, for example, having the same indentation level as any plain text around it and/or the same bullet and indention level appropriate to its position.

Moreover, embedded clips 212 might have attributes (e.g., indicated in the clip data for the clip) that include which recording, such that clips referring to different recording objects are embedded in the same page, in examples. The clips also include additional information such as which speakers or participants were active in the clip, as well as other meta-information, all of which can be presented or hidden in the page editor 90 depending on the user's goals (e.g., based on user supplied or inferred display parameters).

The GUI 87 rendered on the display 84 of the user device 80 also includes a clip player 92, which is a display element for streaming playback of the portions of the time-indexed media data referenced by the embedded clips. In one example, the clip player 92 is first hidden and, in response to user selection of the clip play button 94 for an embedded clip, the clip player 92 is displayed overlaid on the page editor 90, and the portion of the recording referenced by the selected embedded clip is streamed and played back or otherwise presented.

Figure 1B:
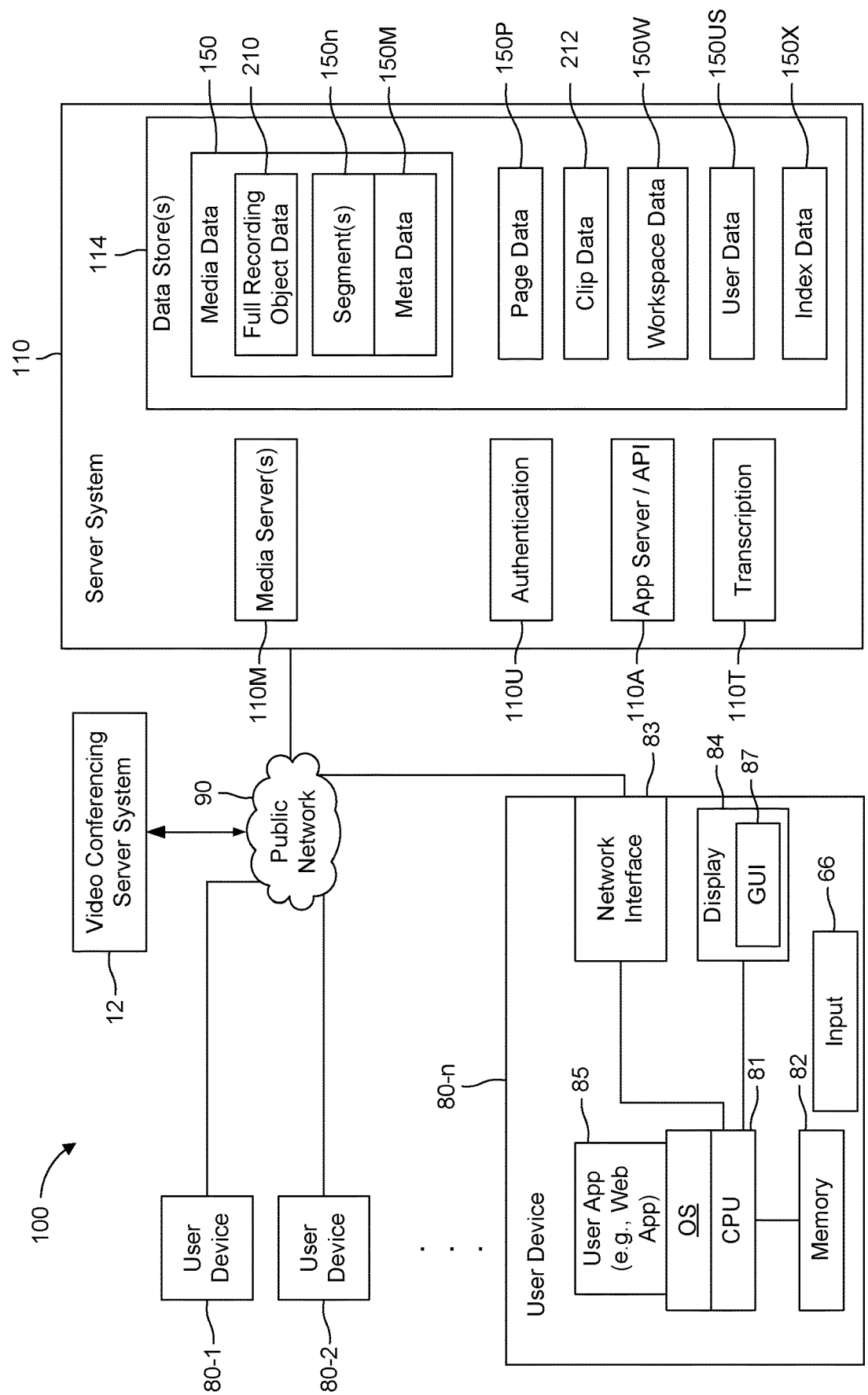
FIG. 1B is a schematic diagram of the media presentation system showing components of the system in additional detail.

FIG. 1B is a schematic diagram of the video conferencing and media presentation system 100 showing components of an exemplary user device 80-n, the video conferencing system 12, and productivity and media presentation server system 110 in additional detail and particularly how the system might be implemented in hardware.

In the illustrated example, a plurality of user devices 80 are connected to the video conferencing system 12 and productivity and media presentation server system 110 via the public network, such as the internet.

The media presentation server system 110 includes an app server 110A, one or more media servers 110M, usually an authentication module 110U, usually a verification module, and one or more data stores 114.

The productivity and media presentation server system 110 and its data store(s) 114 are typically implemented as a cloud system. In some cases, the server system 110 includes one or more dedicated servers having respective central processing units and associated memory. In other examples, they are virtual servers that are implemented on underlying hardware systems. The server system 110 may run on a proprietary or public cloud system, implemented on one of the popular cloud systems operated by vendors such as Alphabet Inc., Amazon, Inc. (AWS), or Microsoft Corporation, or any cloud data storage and compute platforms or data centers, in examples. The server system 110, app server 110A, and/or media server(s) 110M can comprise or use various functions, modules, processes, services, engines, and/or subsystems. These various functions, modules, processes, services, engines, and/or subsystems, including the authentication module and verification module, and/or the app server and/or media server(s) themselves, are generally associated with separate tasks and can be discrete servers, or the separate tasks can be combined with other processes into a unified code base. They can be running on the same server or different servers, virtualized server system, or a distributed computing system. The server system 110 may also be implemented as a container-based system running containers, i.e., software units comprising a subject application packaged together with relevant libraries and dependencies, on clusters of physical and/or virtual machines (e.g., as a Kubernetes cluster or analogous implementation using any suitable containerization platform). Moreover, the user app 85, app server 110A, authentication module, verification module, transcription and automation module 110T and/or media server(s) 110M can utilize or comprise various interacting functions, modules, processes, services, engines, and/ or subsystems that are associated with discrete tasks, implemented as services or microservices running on different servers and/or a centralized server of the server system, and accessible by clients (e.g., user app executing on user devices, other services running on the server system).

The data store(s) 114 provide storage for the processed and segmented time-indexed media data 150 along with the clip data 212 for the clip objects, the page data 150P for the different pages (e.g., including references to the clip data and segmented media data), workspace data 150W, and/or user data 150US used by the user app to present the different pages via the page editor and provide editing, collaboration, and sharing functionality for the different users. In addition, the data store(s) store authentication data for verifying user-supplied credentials and generating new login sessions for the users. The data store(s) also store permissions data for controlling access (e.g., reading and/or modifying) by users to pages, workspaces, and/or recordings (including media data). In one embodiment, the data store(s) are provided via a storage service accessed via a web interface, such as S3 provided by Amazon Web Services. In one example, newly ingested recordings are stored as objects in an S3 bucket.

The app server 110A provides an application programming interface (API) and handles requests from the user devices 80 (e.g., via the respective user apps 85 executing on those user devices) to create, retrieve and/or modify any of the page data 150P, clip data 212, workspace data 150W, user data 150US, and/or index data 150X. The app server 110A also generally handles ingestion processing of new recordings.

The media server(s) 110M receive playback requests from the user apps 85 (along with possibly a playback token for authentication) and, in response, retrieve the time-indexed media data 150 for requested portions of full recordings (e.g., segments, portions of segments) from the data store(s) 114 and return the media data to the user device 80 (e.g., by generating playable media based on the retrieved media data and streaming the playable media to the user device). In one embodiment, the media server(s) 110M and any data stores 114 storing the processed and segmented media data are implemented as a content delivery network (CDN), and the user app directs the playback requests to particular servers at particular addresses indicated in streaming manifests provided by the app server 110A. In embodiments, the media server(s) user protocols, such as MPEG DASH or Apple HLS, are used to create playable pieces and stream them to the client.

In general, the authentication module 110U retrieves the stored permissions data from the data store(s) 114 and the user data 150US and generates signed cryptographic tokens identifying users and/or incorporating context-specific permissions data for the identified users. The tokens generated by the authentication module 110U are sent to the user device 80, which stores the tokens in local memory 82. The tokens can include session tokens, which the user device 80 includes with requests to the app server 110A to retrieve and display page data 150P and workspace data 150W or modify data in the data store(s) 114 such as permissions data, to list a few examples. The tokens can also include playback tokens, which the user device includes with playback requests to the media server(s) 110M for streaming media data from the data store(s).

The verification module generally enforces access control with respect to incoming requests for any data stored in the data store(s) 114, including page data 150P, clip data 212, and/or media data 150 based on tokens provided with the requests and/or permissions data stored in the data store(s).

The user devices 80 are generally computing devices operated by users of the media presentation system, and the system can accommodate many user devices 80 operated by different users at different times or simultaneously. The user device 80 will typically be a desktop computer, laptop computer, a mobile computing device such as a smartphone, tablet computer, phablet computer (i.e., a mobile device that is typically larger than a smart phone, but smaller than a tablet), smart watch, or specialized media presentation device to list a few examples. Each user device 80 includes a central processing unit 81, memory 82, a network interface 83 for connecting to the public network 90, and a display 84. Executing on the processor 81 is an operating system OS and the user app 85 which could be a browser, which generally receives user input (e.g., via input devices 66 such as a keyboard, mouse, and/or touchscreen, among other examples) indicating selections of pages to display via the page editor, changes to the pages, desired playback of recordings and/or clips, and new recordings to be ingested, to name a few examples. The user app 85 also receives from the server system 110 information such as page data 150P, clip data 212, workspace data 150W, user data 150U, and/or index data 150X for displaying the media data, page contents, the page editor, and other interface elements on the display 84 via a graphical user interface 87, which the user app 85 renders on the display 84. In one example, the user app 85 is a software program executing on the processor 81 (via the operating system), such as a web browser, and renders specifically a browser user interface within a larger GUI 87 serving the user app 85, web browser, and other applications and services executing on the processor 81 of the user device 80. In another example, the user app 85 executes as a standalone software program executing on the processor 81 (via the operating system) and renders its own GUI 87 (e.g., in one or more windows generated by the standalone software application).

Figure 2:
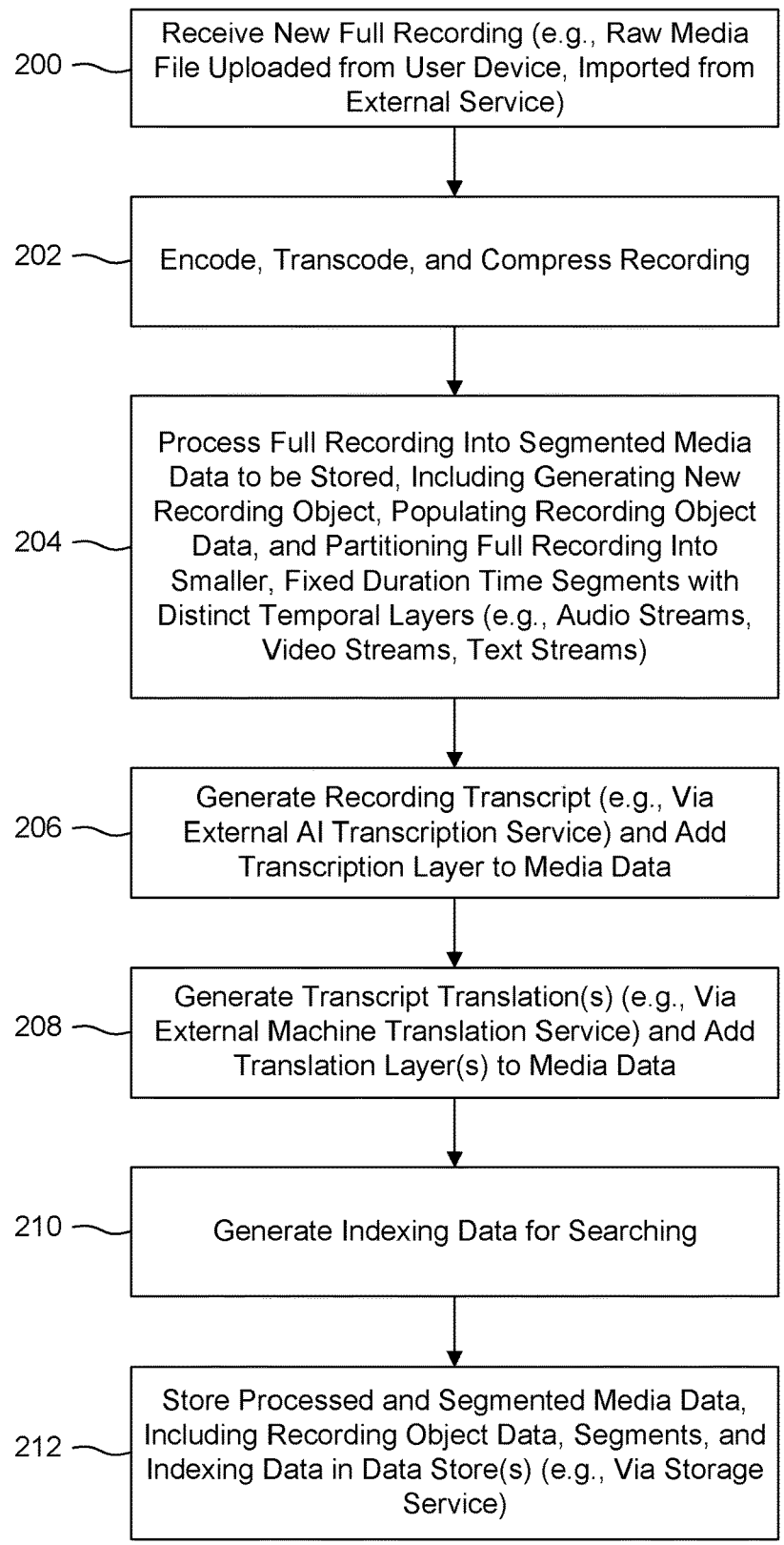
FIG. 2 is a flow diagram illustrating an ingestion process for newly received recordings.

FIG. 2 is a flow diagram illustrating an ingestion process for newly received recordings provided by the video conferencing, productivity and media presentation system 100.

First, in step 200, the app server receives a new (full) recording. In one example, the GUI 87 rendered on the display 84 of the user device 80 includes interface elements for receiving user input indicating a selection of a raw time-indexed media file for the recording (e.g., stored locally on the user device), which is then uploaded to the app server 110A in response to the selection. In another example, the GUI receives selections indicating a recording prepared and/or hosted by an external video conferencing service 12 (e.g., Zoom, Google Meet), and, in response, the app server imports the recording via an API or receives the live streamed video conference.

In step 202, the app server 110A encodes, transcodes, and/or compresses the raw media for the full recording. In one embodiment, the app server 110A encodes and compresses the raw media using the Advanced Video Coding (AVC) codec (also known as h.264), resulting in a bitstream with multiple video and audio layers representing different levels of quality for adaptive streaming based on different network conditions and/or computing contexts (e.g., at different speeds). Other codecs could also be used, such as High Efficiency Video Coding (HEVC) (also known as h.265), and VP8/9.

In step 204, the app server 110A processes the recording for storage in the data store(s) 114 as segmented media data 210. This primarily involves partitioning the media for the recording into smaller segments 150n each of a fixed duration (e.g., 1-10 seconds, preferably 1-6 seconds). In one embodiment, the segmented media data 210 is generated using the Common Media Application Format (CMAF) data container to break the video into the fixed duration segments, which can be fetched independently, which was designed to work with multiple streaming technologies and uses the ISO Base Media file format (ISO-BMFF) (sometimes referred to as MPEG-4 or MP4) with additional restrictions imposed by CMAF to make the media shareable across different streaming solutions. In order to keep video, audio, and text aligned, each encoding layer (resulting from step 202, for example) uses the same segment duration. In the current embodiment, the recording is split into multiple files, but it is also possible to use a single file and request regions of the file. Here, also, the app server 110A generates a new recording object 210 and populates it with recording object data (e.g., recording identification (ID), name, owners and/or uploader of the recording, upload date, meeting date, duration meta-data generation) and associates the recording object data with the segmented media data to be stored.

In step 206, the app server 110A generates a recording transcript (e.g., via the transcription module 110T, which can be an external transcription service such as Amazon Transcribe using artificial intelligence and an API) and adds an additional transcription text layer, including the transcription text, to the processed media data. In one example, the app server and/or external transcription service distinguishes between different speakers in the audio data, and the transcription text includes attribution to the different detected speakers. In one embodiment, the app server further enriches the text layer(s) of the processed media data by extracting text that is discernible within the video layer(s) (e.g., from displayed presentation slides). This information is stored in a transcript layer 271.

Similarly, in step 208, the app server 110A generates translations of the transcription layer from the original language of the transcription to one or more other languages (e.g., via an external translation service using an API) and adds any additional translation text layers, including the translated text, to the processed media data in the transcript layer 271.

In step 210, the app server 110A generates indexing metadata 150X for searching within the transcription and/or translation text layers of the processed media data 150.

In step 212, the processed and segmented media data, including the recording object data and fixed duration time segments, are stored in the data store(s) along with the indexing data. In one embodiment, the audio, video, and text segments of the processed and segmented media data are stored as separate objects in the data store(s) (e.g., S3 bucket for serving the content), all with a common path prefix.

In this way, newly ingested recordings are processed, enriched, and stored as segmented media data 150 with multiple temporal layers (e.g., audio, video, metadata, presentation, transcription, translations) along with indexing data making the processed media data searchable.

Figure 3A:
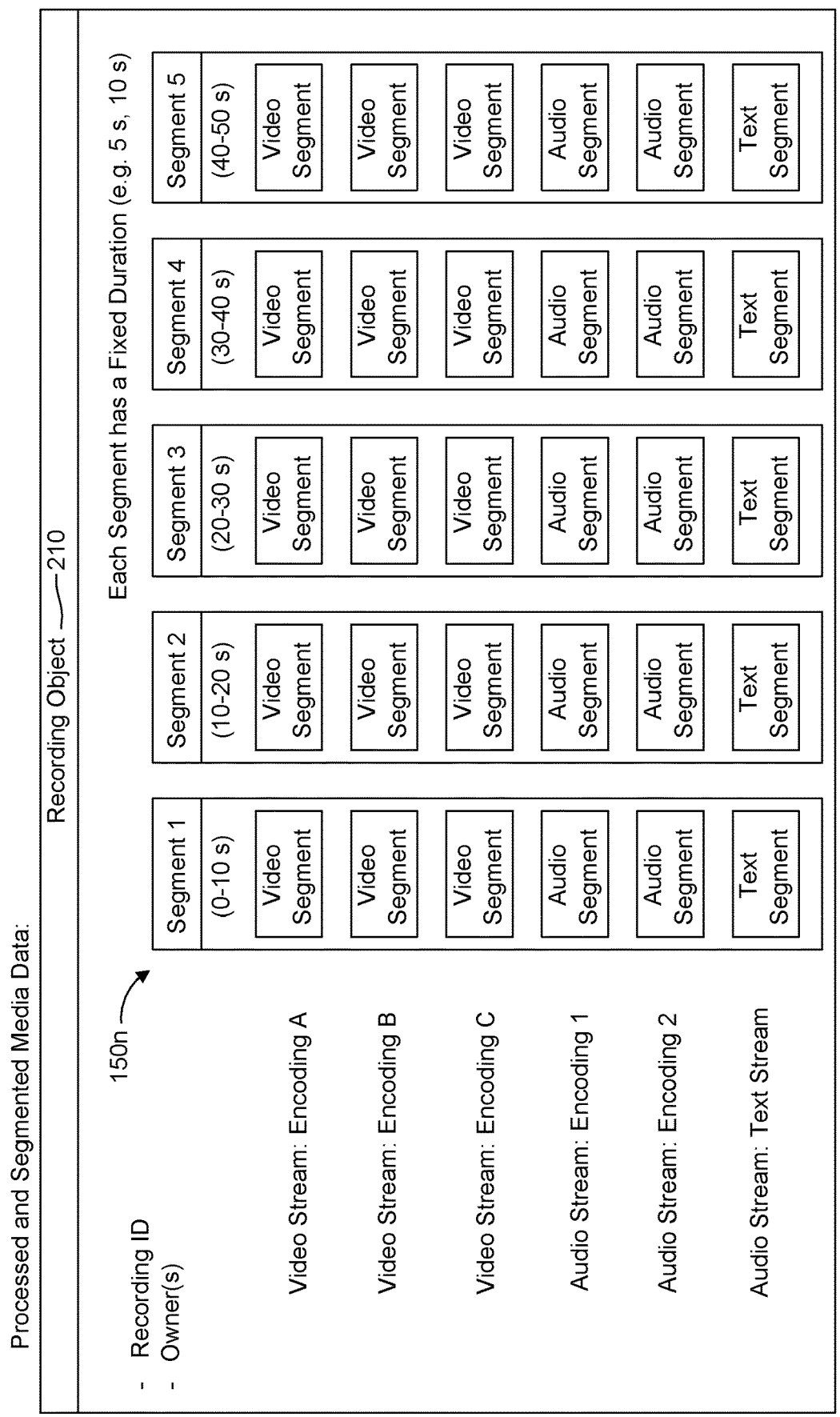
FIG. 3A is a schematic diagram showing an example of processed and segmented media data stored by the media presentation system.

FIG. 3A is an illustration of an example of the processed and segmented time-indexed media data 150 that is stored in the data store(s) 114 upon ingestion. A recording object, having a recording ID and a list of owners, contains or is associated with five different segments 150*n* (Segment 1-Segment 5), each having a fixed duration of ten seconds and corresponding to successive portions of the original full recording along a temporal dimension. For each of the segments, there are multiple time-indexed bitstream content layers, including three video stream layers (Encoding A, Encoding B, Encoding C), two audio stream layers (Encoding 1, Encoding 1), and a text stream layer corresponding to the transcript of the corresponding segment. Within each of the segments, there are video, audio, and text segments corresponding to the respective layers.

Figure 3B:
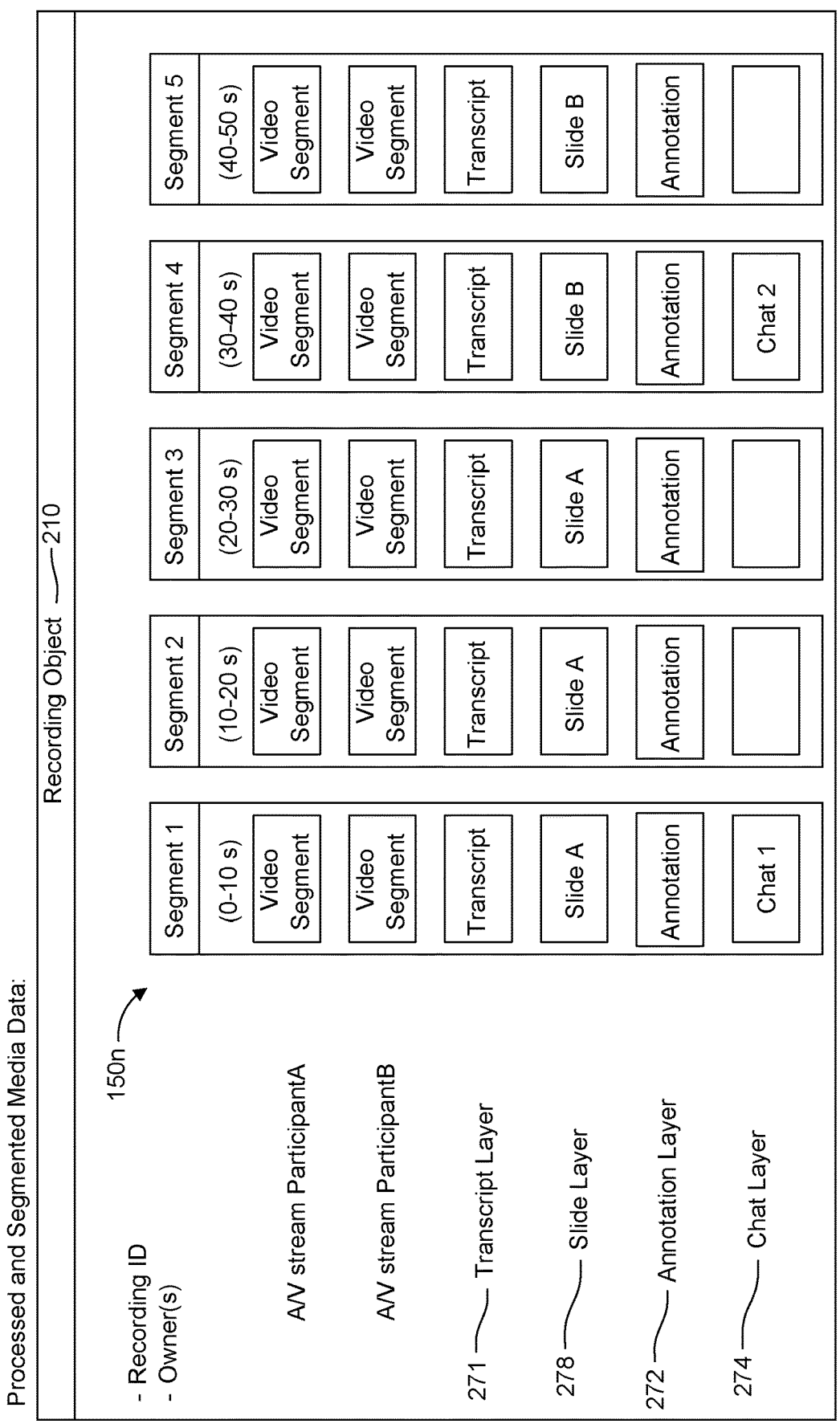
FIG. 3B is a schematic diagram showing an example of processed and segmented media data for another event additionally showing other layers of time-index data.

FIG. 3B is another illustration of the processed and segmented time-indexed media data 150 that is stored in the data store(s) 114 emphasizing additional time-indexed content layers such as for audio, video, text, and/or metadata content, including transcripts, translations, speakers, and tags, among other examples.

In more detail, in the illustrated example, the recording object again has five different segments 150*n* (Segment 1-Segment 5), each having a fixed duration corresponding to successive portions of the original full recording along a temporal dimension for the successive segments. For each of the segments, there are multiple time-indexed content layers. In this example, there are two audio and video streams for each of the two participants, ParticipantA, ParticipantB. In addition, there is a transcript layer 271 that corresponds to the transcript extracted from the event's audio via voice recognition. An annotations layer 272 includes information such as comments written during the meeting or added afterward the meeting and possibly other information such as index information or tags added by users or automatically. A chat layer 274 is a record of the messages sent during the meeting at different times using the messaging system of the video conferencing system 12. A slides layer 278 contains the slides and/or the screenshare images or video that were displayed during each segment of the event.

Figure 4:
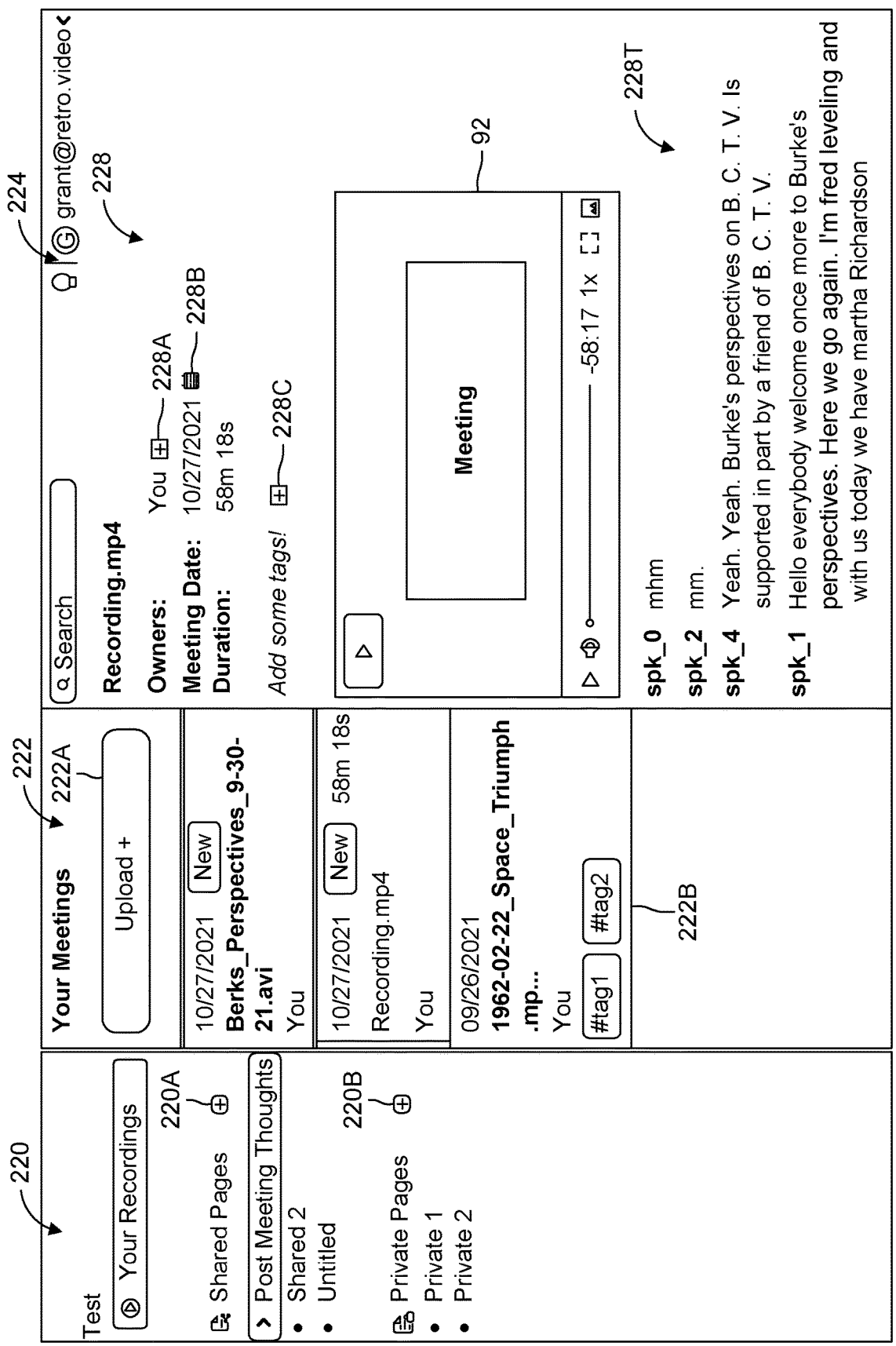
FIG. 4 is an illustration of an exemplary recording screen of a graphical user interface (GUI) rendered by a user app and displayed on a display of a user device.

FIG. 4 is an illustration of an exemplary recording screen of the GUI 87 rendered by the user app 85 and displayed on the display 84 of the user device 80 in the video conferencing, productivity and media presentation system 100.

In general, the GUI 87 includes a series of screens or views such as the page editor and the recording screen for displaying information and receiving input from the user. These screens each comprise graphical elements (such as icons, virtual buttons, menus, textual information) arranged within windows and/or panes. In response to detecting input from the user indicating interaction by the user with the graphical elements, the user app 85 receives input indicating selection of various options or functions represented by the graphical elements.

More particularly, the GUI 87 comprises a home pane, a page navigation pane 220, a recordings pane 222, and a main display pane 224, which is either a recording display pane or a page display pane.

The home pane includes a recordings button, upon selection of which the GUI shows the recordings pane.

The page navigation pane 220 includes a selectable page directory arranged in a hierarchical fashion allowing nested groups of pages to be expanded (e.g., revealed) or collapsed (e.g., hidden) in a shared pages section or a private pages section. The page navigation pane also includes add shared pages buttons 220A and add private pages buttons 220B, which, at the root level, are always displayed but at other levels of the hierarchy are only displayed when one of the pages indicated in the hierarchy is currently selected or hovered over (e.g., via a pointer of a mouse device).

The recordings pane 222 comprises an upload button 222A for uploading new recordings and an indication of the recordings 222B (e.g., stored in the data store(s)) for which the current user is indicated as the owner. Upon selection of any of the recordings indicated in the recordings pane 222, a recording screen or player 92 is displayed in the main display pane 224.

In general, the recording screen 228 presents information about a recording, including textual information indicating the recording's owners, meeting date, and duration, and transcript text 228T for the recording. The recording screen 228 comprises an add owner button 228A, a recording data selector 228B, and an add tag button 228C, selection of which allows the user to enter or change the respective information associated with the button/selector. The recording screen 228 also comprises a recording player 92, with selectable playback buttons associated with playback of the media data for that recording, which is streamed by the media server(s) to the user device when the user selects the play button on the recording player, for example.

Figure 5:
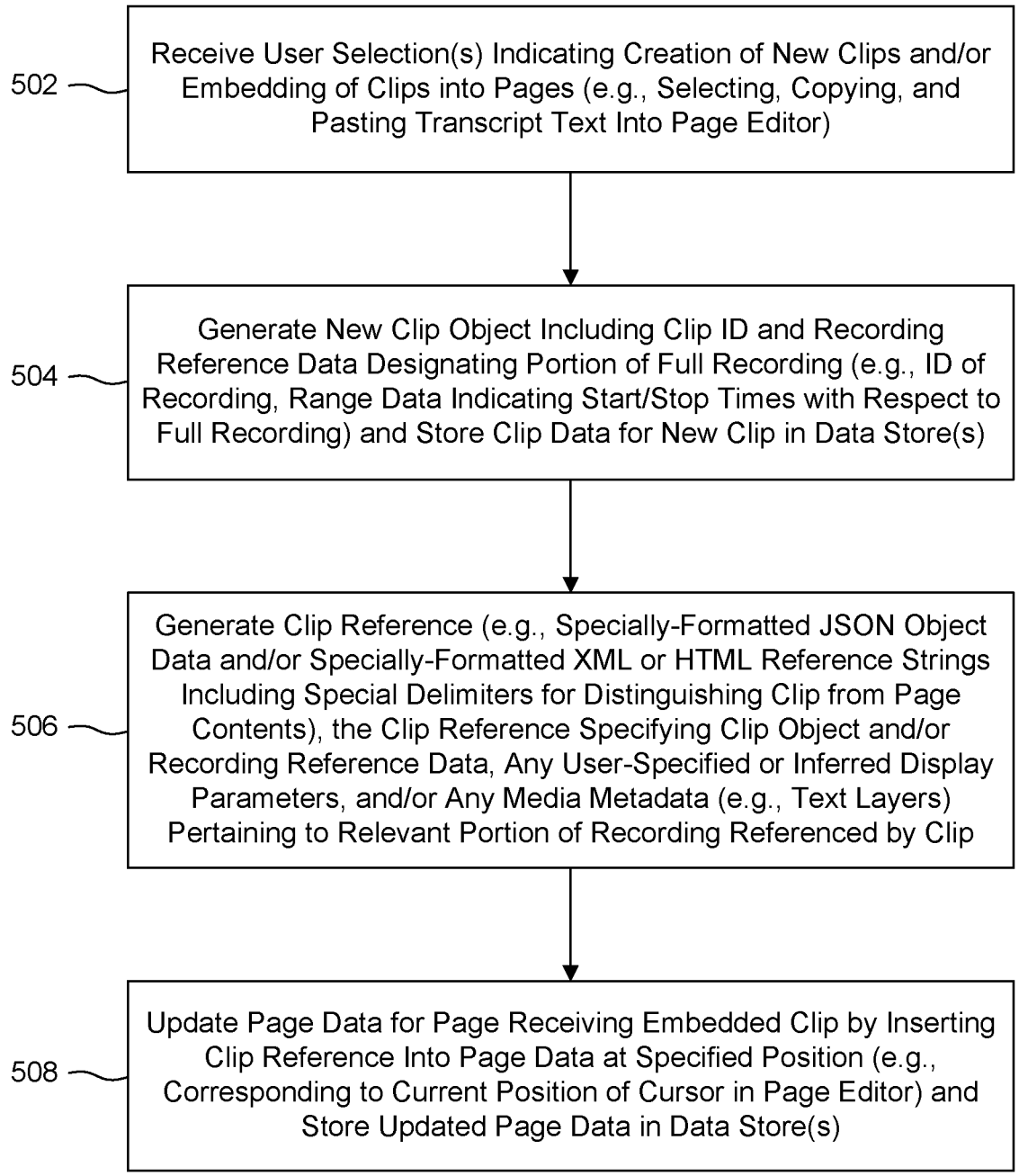
FIG. 5 is a flow diagram illustrating a process for generating new clips and embedding the new clips in a page presented by the user device.

FIG. 5 is a flow diagram illustrating a process for generating new clips and embedding the new clips in a page in the video conferencing, productivity and media presentation system 100.

First, in step 502, the user app detects user input indicating insertion of user-selected portions of time-indexed content (e.g., displayed transcript text, presentation slides, screenshare images) into the pages via the page editor. For example, the user app detects selecting (e.g., via highlighting) by the user of a portion of transcript text 228T displayed in the recording screen 228 of the recording screen of FIG. 4 and detects predetermined keyboard sequences and/or pop up menu selections for copying the highlighted portion of the displayed transcript text (e.g., via a copy sequence entered on a keyboard such as Control-C or selection of a copy option in a right click menu) and pasting of the copied text into the page editor (e.g., via a paste sequence entered on a keyboard such as Control-V or selection of a paste option in a right click menu). In another example, the user app 87 detects copying of a selected or highlighted portion of transcript text presented in a clip display element for a clip embedded in a page currently presented by the page editor, and pasting of the copied selection into the same page and/or into a different page. In yet another example, the user app detects an input sequence for dragging and dropping of a highlighted portion of displayed transcript text into a page via the page editor. In another example, the user app detects selection of one or more presentation slides or screen share images of the recording and possibly input sequences for copying and pasting, dragging and dropping, or otherwise inserting of the selected presentation slides or screenshare images into the pages via the page editor. In another example, the user app, via the GUI, implements a time range selector for selecting portions of the recordings (e.g., by receiving input indicating start and stop times of the selected portions with respect to the duration of the recordings).

There are additional ways of delineating the audio and video and associated time indexed layers. These include metadata layers specifying different speakers, new slides, changes in screenshares. These can all be used as mechanisms for delineating different portions of the event and thus the time-index layers, in addition to the transcript text, presentation slides, screenshare images discussed here.

In response, in step 504, the user app generates clips or reference data 212 defining referenced portions of time-indexed content (e.g., the stored time-indexed media data) delineated by the received user selections such as the selected transcript text, the selected presentation slides, screenshare images and/or the range (e.g., start/stop times) selected via the range selector. This clip reference data is embedded into the pages and typically encapsulates all of the layers including the transcript layer 271, the annotations layer 272, the chat layer 274, and the slides/screenshare layer 278.

For example, the user app generates a new clip object 212 with a clip ID and recording reference data designating a portion of the full recording corresponding to the user-selected portion of the recording. In one example, the user app determines the designated portion based on the underlying timestamp information corresponding to the transcript text that was displayed, selected, copied and pasted. Although the recording screen only presents the transcript text itself, the user app has access to additional data from the transcript text stream that is included with the data that was retrieved from the data store(s) when loading the contents of the recording screen, namely start and end times associated with each word of the transcript text and indicated as attributes of the markup tags associated with each of the displayed words of the transcript text. Thus, the user app determines the designated portion of the full recording based on the start time associated with the first word of the selected, copied, and pasted text and the stop time associated with the last word of the selected, copied, and pasted text. As the start and end times associated with the transcript text are indicated with respect to the clip itself, the user app also translates the start and end times from the transcript text into start and end times designating a range with respect to the full recording based on the start and end times indicated by the clip 212 with respect to the recording. In any event, the user app 85 stores the generated clip data for the new clip object 212 in the data store(s) 114.

In step 506, the user app 85 generates a clip reference indicating the newly generated clip object 212. The clip reference includes the generated reference data for the selected portion of the recording and can be a specially formatted JSON object data and/or specially-formatted XML or HTML reference strings with special delimiters for distinguishing the clip from the user-authored contents and/or display data, to name a few examples. The clip reference can also include user-specified or inferred display parameters, and/or any media metadata pertaining to the relevant portion of the recording referenced by the newly created clip.

In step 508, the media presentation system 100 embeds the generated reference data defining the referenced portions of the time-indexed content into the pages. For example, the user app 85 updates the page data for the page receiving the embedded clip by inserting and rendering clip display elements 212D as part of the page data 150P at a specified position (e.g., based on the current position of the cursor within a text input box of the page editor containing the contents of the page). The user app 85 then stores the updated page data in the data store(s) 114 and displays the updated page by rendering the updated page data with the page editor 90.

Figure 6:
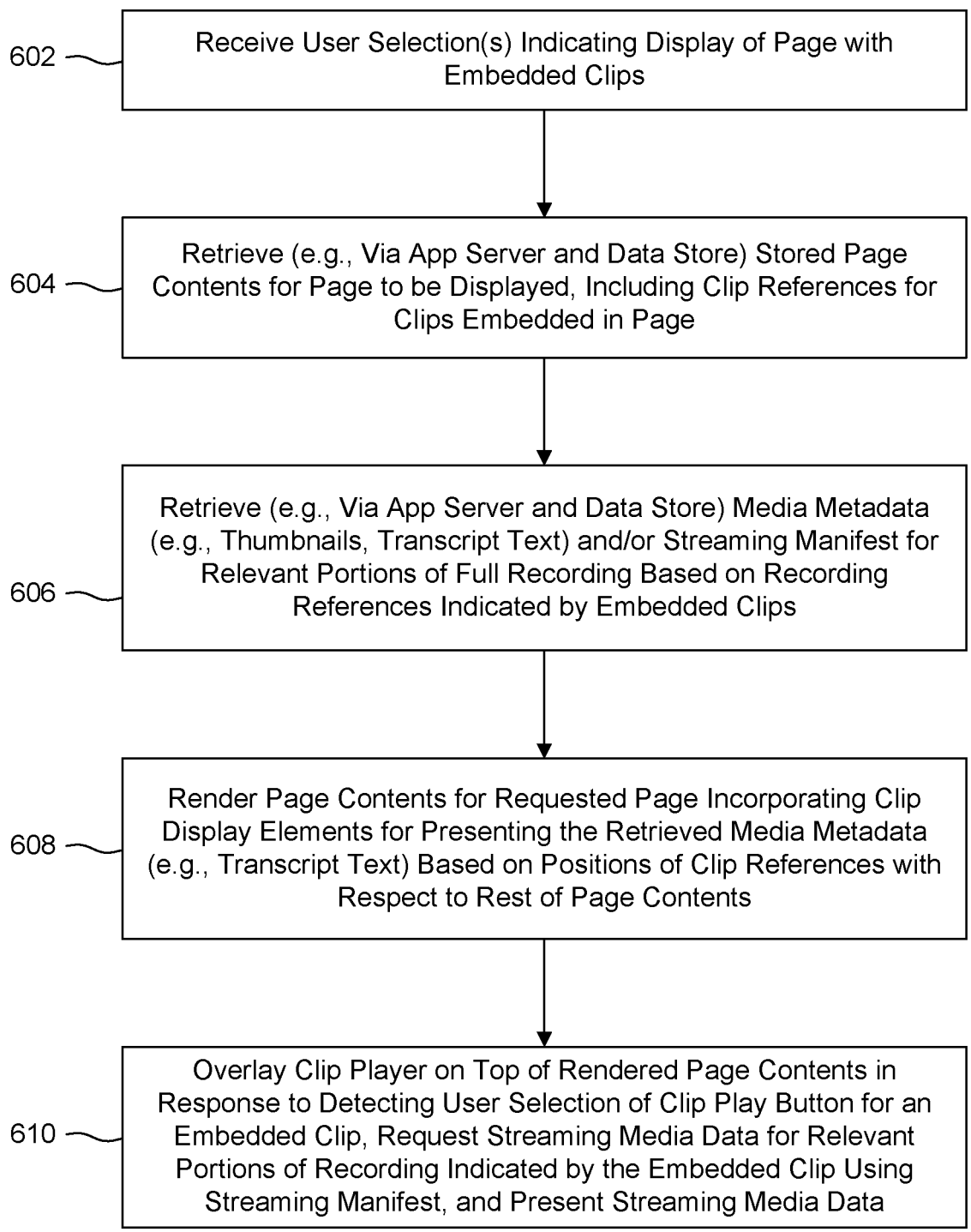
FIG. 6 is a flow diagram illustrating a process for displaying a page with embedded clips and streaming media data for the embedded clips.

FIG. 6 is a flow diagram illustrating a process performed by the video conferencing, productivity and media presentation system 100 enabling users to selectively display content derived from the stored time-indexed media data, including content from the text (transcript), presentation slide, screenshare images, and/or metadata layers, corresponding to the referenced portions defined by the reference data. In examples, this includes displaying a page with embedded clips and/or streaming media content for the embedded clips.

First, in step 602, the user app 85 receives selections from the user indicating display of a page with embedded clips 212. In one example, the user app detects selection by the user of one of the pages indicated in the page navigation pane 220 of the GUI.

In step 604, the user app 85 retrieves (e.g., from the data store(s) via the app server) the stored page data 150P including the user-authored content of the page to be displayed, the retrieved page data includes the clips 212 embedded in the page.

In step 606, the user app 85 then retrieves (e.g., from the data store(s) 114 via the app server 110A) content derived from the stored time-indexed media data such as thumbnails and/or transcript text data as well as a streaming manifest for requesting streaming of relevant portions of the full recording based on recording references indicated within the clip reference for each of the clips embedded within the page. In one embodiment, the manifest is generated using the MPEG-DASH MPD format manifest. Alternatively, other formats like HLS can be used.

In step 608, the user app 85 renders the page contents based on the retrieved page data and/or media content, incorporating clip display elements 212D for presenting the retrieved media content (e.g., transcript text) based on the positions of the respective clip references 212 with respect to the rest of the page contents.

Finally, in step 610, the user app 85 overlays the clip player 92 on top of the rendered page contents in response to detecting user selection of the clip play button 94 for any of the embedded clips, requests streaming media data for relevant portions of the full recording indicated by the embedded clip from the media server(s) using the streaming manifest provided for the embedded clip, and presents the streaming media data to the user via the clip player.

Figure 7:
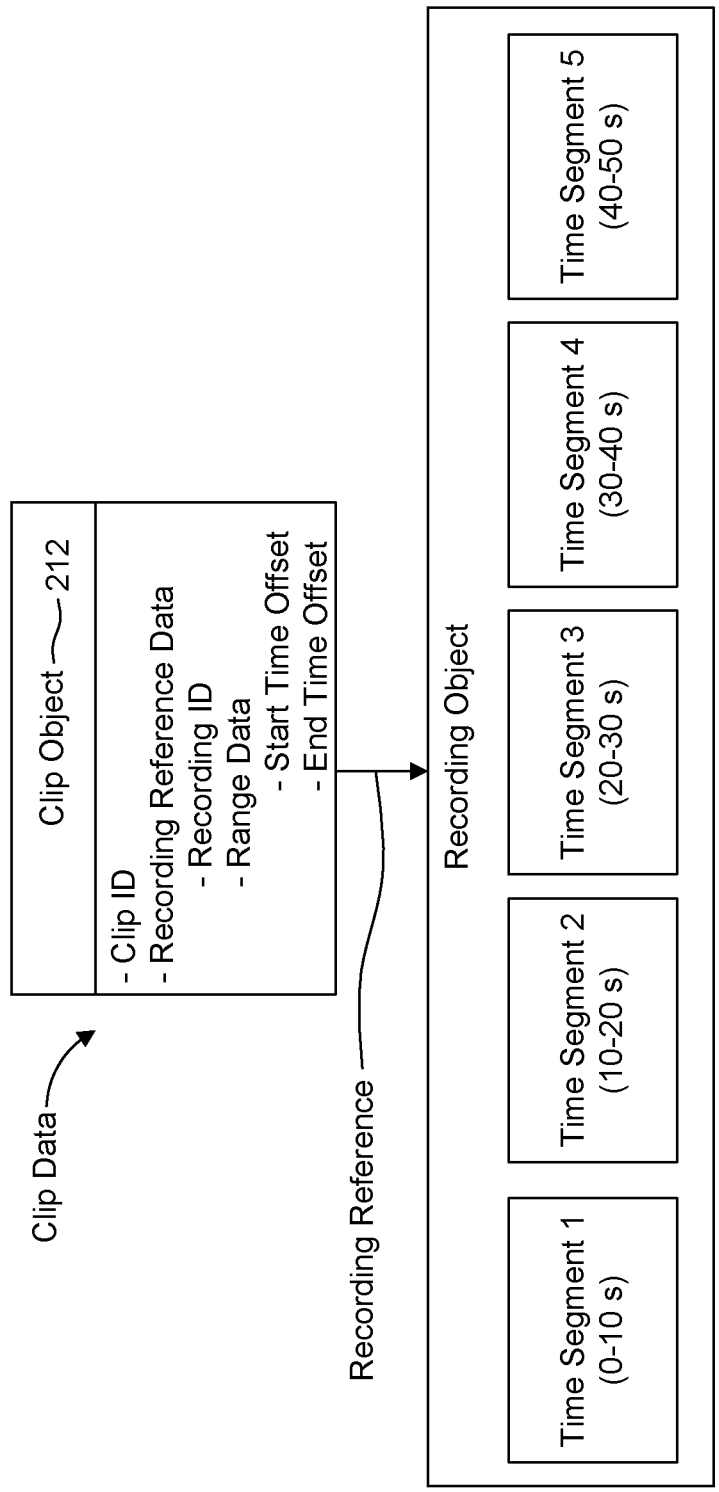
FIG. 7 is a schematic diagram showing clip data stored and provided in underlying display data for presenting pages with embedded clips.

FIG. 7 is an illustration of exemplary clip data 212 stored in the data store(s) 114 and provided in the underlying display data for pages with embedded clips, showing how the clip data 212 relates to the recording object data 210 and segmented media data via the recording reference. As in the examples of FIGS. 3A and 3B, a recording object 210 contains or is associated with five different segments, each having a fixed duration of ten seconds and corresponding to successive portions of the original full recording. Now, however, a clip object 212 is shown (note the various layers of the recording object are omitted for the sake of clarity). The clip object 212 has a clip ID uniquely identifying the clip along with recording reference data. The recording reference data includes the recording object's recording ID, which is a universally unique identifier (UUID), and range data indicating a range with respect to the full recording of the recording object 210. The range data includes a start time offset and an end time offset, indicating start and end times, respectively, for the referenced portion of the full recording. In one embodiment, the range data might also include an ordered list of segments pertaining to the clip and/or a definition of what type of data to include (e.g., video, audio, text). In one embodiment, multiple clips referencing the same recording can overlap with each other.

In general, the app server 110A uses this representation to generate the appropriate manifests based on the available data.

Figure 8:
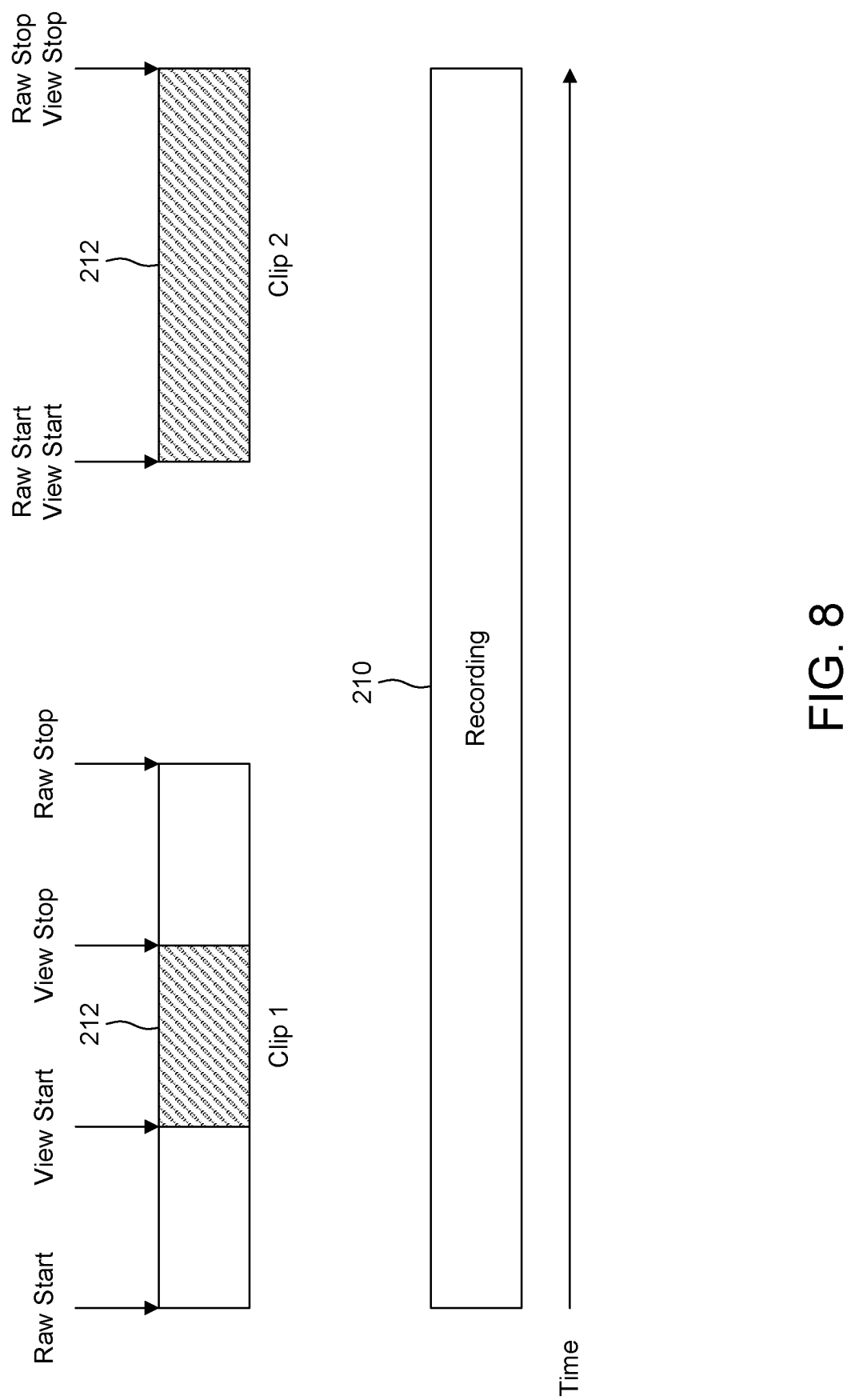
FIG. 8 is a schematic diagram showing exemplary clips referencing a full recording.

FIG. 8 is an illustration of exemplary clips 212 referencing a recording object 210 using range data such as start and end times. Each of the clips includes a raw start time, a view start time, a view stop time, and a raw stop time. The raw start and stop times define a portion of the underlying stored media data segment(s) 150*n* for the clip that can potentially be referenced by the clip, for example, if a user having write access to the clip via the page attempts to expand the scope of the referenced portion. The view start and stop times define the portion of the underlying stored media data segment(s) that is currently referenced by the clip, including the referenced portion of the recording that is presented during display or playback of a clip. In the illustrated example, for the first clip, the raw start time precedes the view start time, and the raw stop time follows the view stop time, indicating that a user having write access to the clip (via the page in which the clip is embedded) would be unable to expand the extent of the portion of the recording referenced by the clip. On the other hand, for the second clip, the raw start time and the view start time coincide, as do the raw stop time and view stop time, indicating that a user having write access would be able to expand the extent of the portion of the recording referenced by clip, which is defined by the view start and stop times, as far as (but not beyond) the extent defined by the raw start and stop times.

Figure 9:
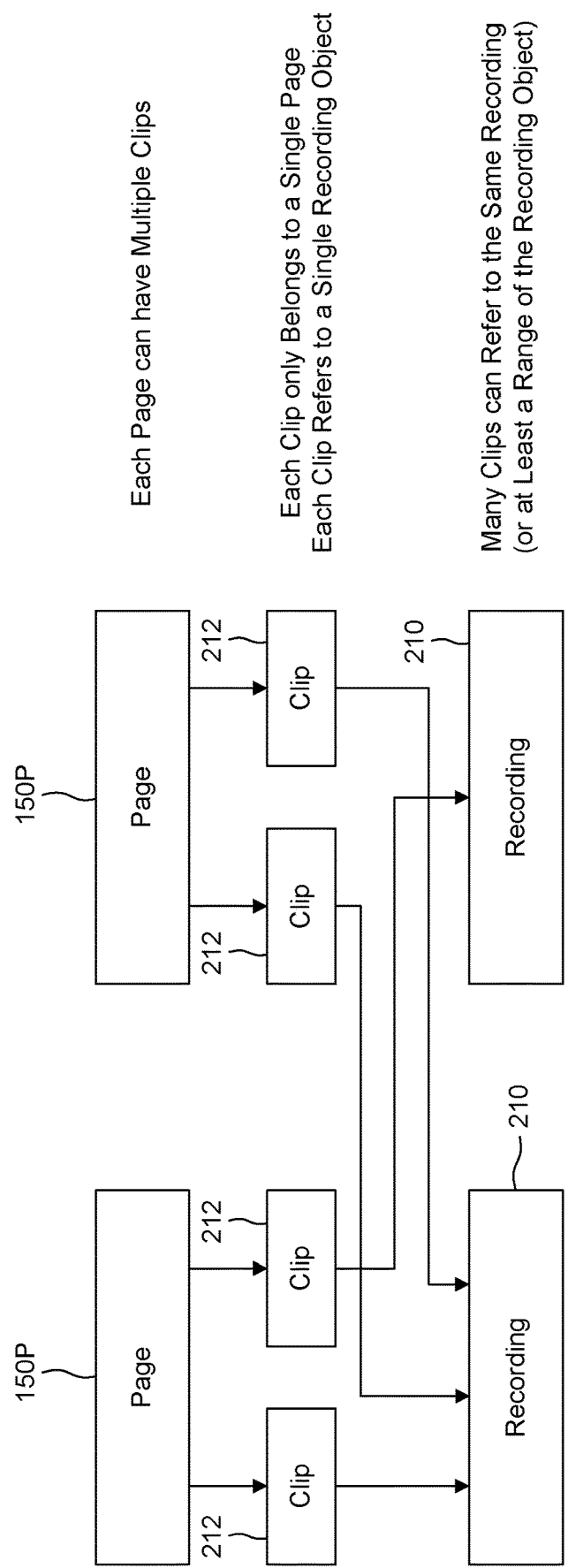
FIG. 9 is a schematic diagram showing exemplary page, clip, and recording objects.

FIG. 9 is an illustration of exemplary page, clip 212, and recording objects 210, showing various properties of the relationships between the different objects. In general, each page object 150P can have multiple clips 212 embedded within it. Each clip can only belong to a single page and can only refer to a single recording object in a current implementation. Many clips 212 can refer to the same recording object 210 or, more particularly, to ranges within the full recording. In the illustrated example, there are two page objects 150P, four clip objects, and two recording objects showing that each page object can contain clips referring to different recording objects. The first page object refers (e.g., via clip references provided in the page data for the page) to the first two clip objects, and the second page object refers to the second two clip objects. The first clip object refers (e.g., via recording references indicated in the recording reference data of the clip object) to the first recording, as does the third and fourth clip. Only the second clip refers to the second recording. Thus, the first page includes two embedded clips, each referring to different recordings, while the second page includes two embedded clips, both referring to the same recording, namely the first one.

Figure 10A:
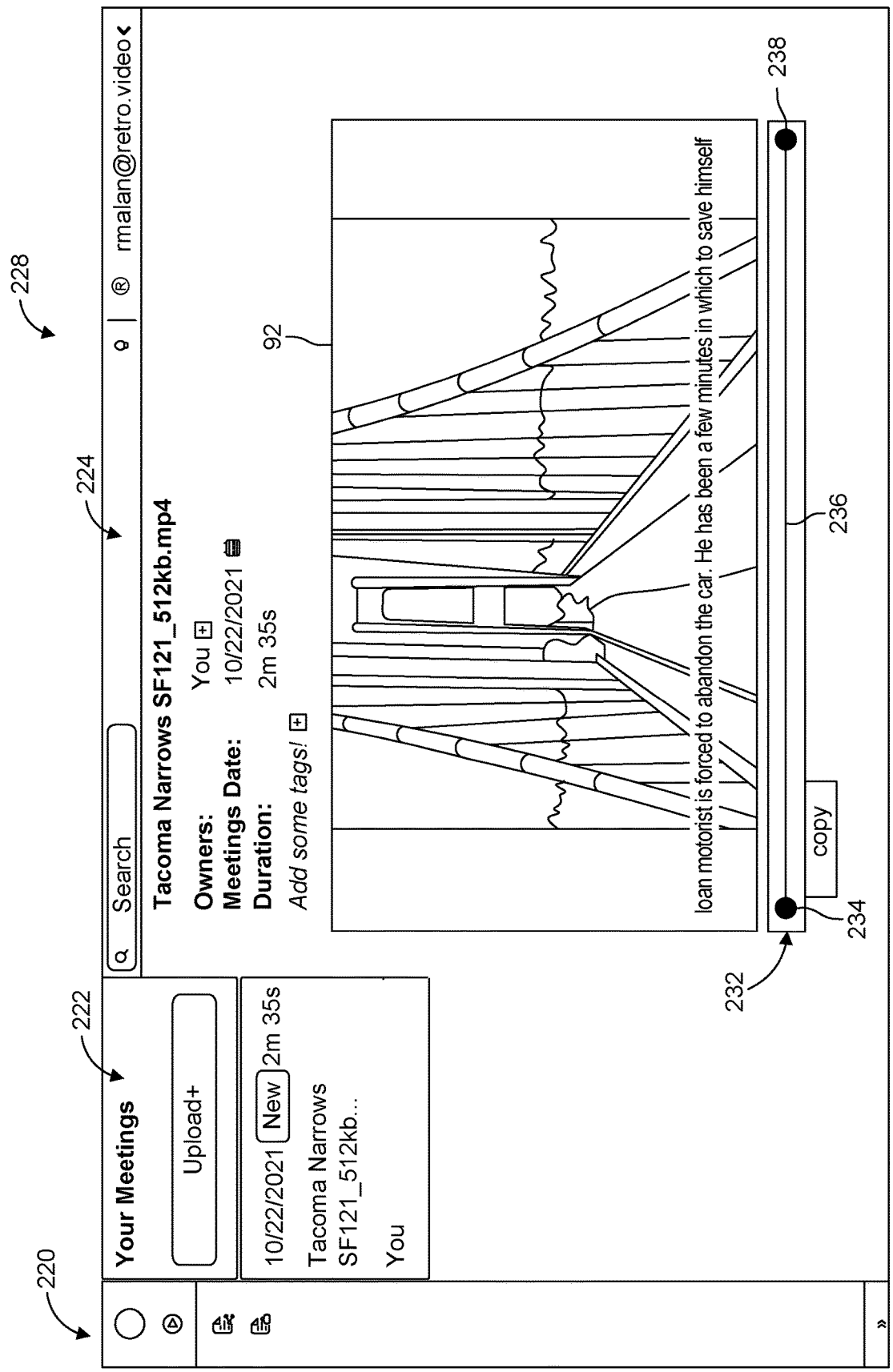
FIGS. 10A-10C show exemplary recording screens of the GUI.
Figure 10B:
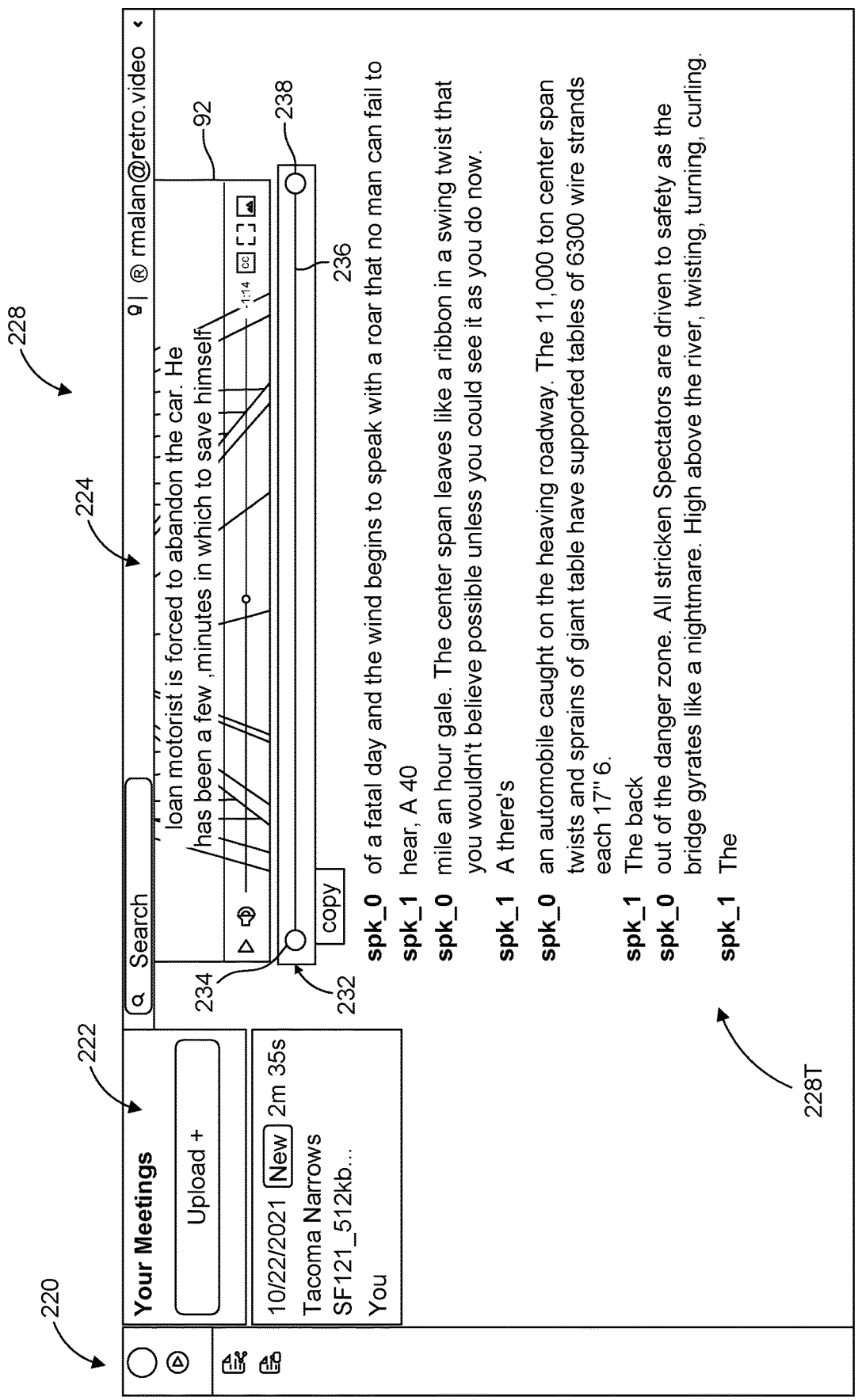
Figure 10C:
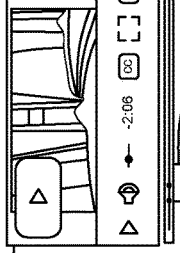

In general, FIGS. 10A-10C are illustrations of an exemplary recording screen 228 similar to that shown in FIG. 4, demonstrating additional functionality. FIG. 10A shows the recording player 92 of the recording screen along with the player controls such as range selector 232, start slider 234, timeline graphic 236 and stop slider 238, but the transcript text is hidden. FIG. 10B shows how scrolling down the recording screen partially obscures the recording player 92 and reveals the transcript text 228T below. In FIG. 10C, however, shows how sufficiently scrolling down the recording screen 228 to reveal the transcript text 228T causes the user app to shrink the recording player 92 and overlay it over the transcript text rather than simply allowing the recording player 92 to move out of view. In response to detecting user selections indicating a portion of the transcript text 228T for playback (e.g., double-clicking on part of the transcript, selecting a play option from a right click menu), the user app 85 causes the recording player 92 to initiate playback of the media data 210 corresponding to the selected portion 228TS of the transcript text 228T.

Additionally, the user app 85, via the recording screen 228, enables selection of portions of recordings to be referenced. Generally, the user app detects the selection of the portions of the recordings via various interface elements of the recordings screen. Although different interface elements enable the selection with respect to only one layer of the media data (for example, transcript text), any clips referencing the selected portion that was indicated with respect to the one layer will encompass all layers of the media data within the time period specified by the clip. One example of the interface elements of the recording screen 228 that enable detecting the selection of portions of the recording is the transcript text presented for the recording, which can be highlighted by the user (e.g., using a pointing device or touchscreen). Another example is a range selector, which comprises a timeline graphic 236, start and stop sliders 234, 238, and a copy button 240. The timeline graphic (e.g., graphically rendered as a line segment) represents the full extent of the duration of the full recording. Accordingly, in the illustrated example, the range selector 232 is displayed directly beneath the recording player 92, and the timeline graphic corresponds visually with a playback progress indicator of the recording player such that points along the timeline graphic of the range selector and analogous points along the playback progress indicator of the recording player (e.g., points representing the same point in time with respect to the duration of the full recording) are vertically aligned with respect to each other. The start and stop sliders of the range selector are overlaid on the timeline graphic and have different positions with respect to the timeline graphic. In one example, the start and stop sliders 234, 238 have default positions at the left and right endpoints, respectively, of the timeline graphic 236. Additionally, the user app detects via the GUI user input indicating positions and/or movement of the sliders (e.g., dragging the sliders left or right along the timeline graphic and/or direct selection of points along the timeline graphic for the sliders). In turn, the point along the timeline graphic where each slider 234, 238 is positioned represents a selected point in time for that slider with respect to the duration of the full recording, with the positions of the start and stop sliders respectively indicating start and stop times delineating a selected portion of the recording with respect to the duration of the recording.

In one embodiment, all of the interface elements for selecting the portions of the recording are synchronized with each other to reflect currently selected portions of the recording regardless of how the selection was made. For example, in response to a portion of transcript text being highlighted 228TS, the user app 85 updates the range selector 232 to show the start and stop sliders positions corresponding respectively to the first and last words of the selected transcript text 228TS, and in response to movement of a start or stop slider of the range selector, the user app 85 displays as highlighted (e.g., with a different color background than that of the rest of the text) a portion of the transcript text starting at a word corresponding to the position of the start slider and ending at a word corresponding to the position of the stop slider.

The user app 85, via the recording screen 228, also enables creating new clips for the selected portions of the recordings. In one example, the user app creates a new clip in response to receiving user input indicating selection of a copy operation (e.g., selecting a copy entry from a right click menu or popup menu, entering a "Control-C" sequence into a keyboard, or a selection of a copy button provided as part of the recordings screen) copying a selected portion of the recording and/or selection of a paste operation (e.g., selecting a paste entry from a right click menu or popup menu, entering a "Control-V" sequence into a keyboard, or selection of a paste button provided as part of the page editor) pasting the copied selection into a page via the page editor. When creating the new clip for the selected portion of the recording, the user app 85 generates range data range data delineating the extent of the selected portion of the recording with respect to the duration of the recording (e.g., start and stop times), the range data ultimately being incorporated into the newly created clip.

In the case of the portion of the recording 210 being selected from the transcript text 228T, the user app generates the range data for the new clip 212 by assigning start and end times corresponding to times associated with the first word and the last word, respectively, of the selected portion 228TS of the transcript text. In one example, the times associated with the words of the transcript text are indicated as time information in the underlying media data (e.g., as part of a transcript text layer providing the words of the transcript text and time information indicating times with respect to the duration of the recording associated with each word), and the user app, when loading the recordings screen 228, retrieves the transcript text 228T and time information from the stored media data for the recording and displays the transcript text and stores the time information, for example, as object data defined within the underlying display data for the page.

In the case of the portion of the recording being selected via the range selector 232, the user app generates the range data for the new clip by assigning start and end times corresponding to the times represented by the respective positions of the start and stop sliders along the length of the timeline graphic.

In any event, in response to detecting user input corresponding to embedding of a new clip into a page, the user app generates a new clip 212 incorporating the range data that was generated from the detected interaction between the user and the interface elements for detecting the selection of portions of the recording. In one example, the detected user input corresponding to the embedding of the new clip into the page includes input indicating a copy operation for copying a portion of the recording selected via the transcript text or the range selector combined with input indicating a paste operation for pasting the copied portion into the page via the page editor. In another example, the detected user input corresponding to the embedding of the new clip into the page includes input indicating a drag and drop operation for dragging a highlighted portion of the transcript text into the page via the page editor and/or the page navigation pane. Here, the user app first detects dragging of the highlighted portion of the transcript text to a position corresponding to a particular page listed in the page navigation pane, in response to which the user device presents the particular page. The user app then detects further dragging of the highlighted portion of the transcript to the page editor, in response to which the user device updates a cursor position of the page editor based on movement of the "dragged" selection within the page. Finally, the user app detects dropping of the dragged selection into the page editor, in response to which the user app inserts a newly created clip at a position corresponding to the current cursor position.

Figure 11A:
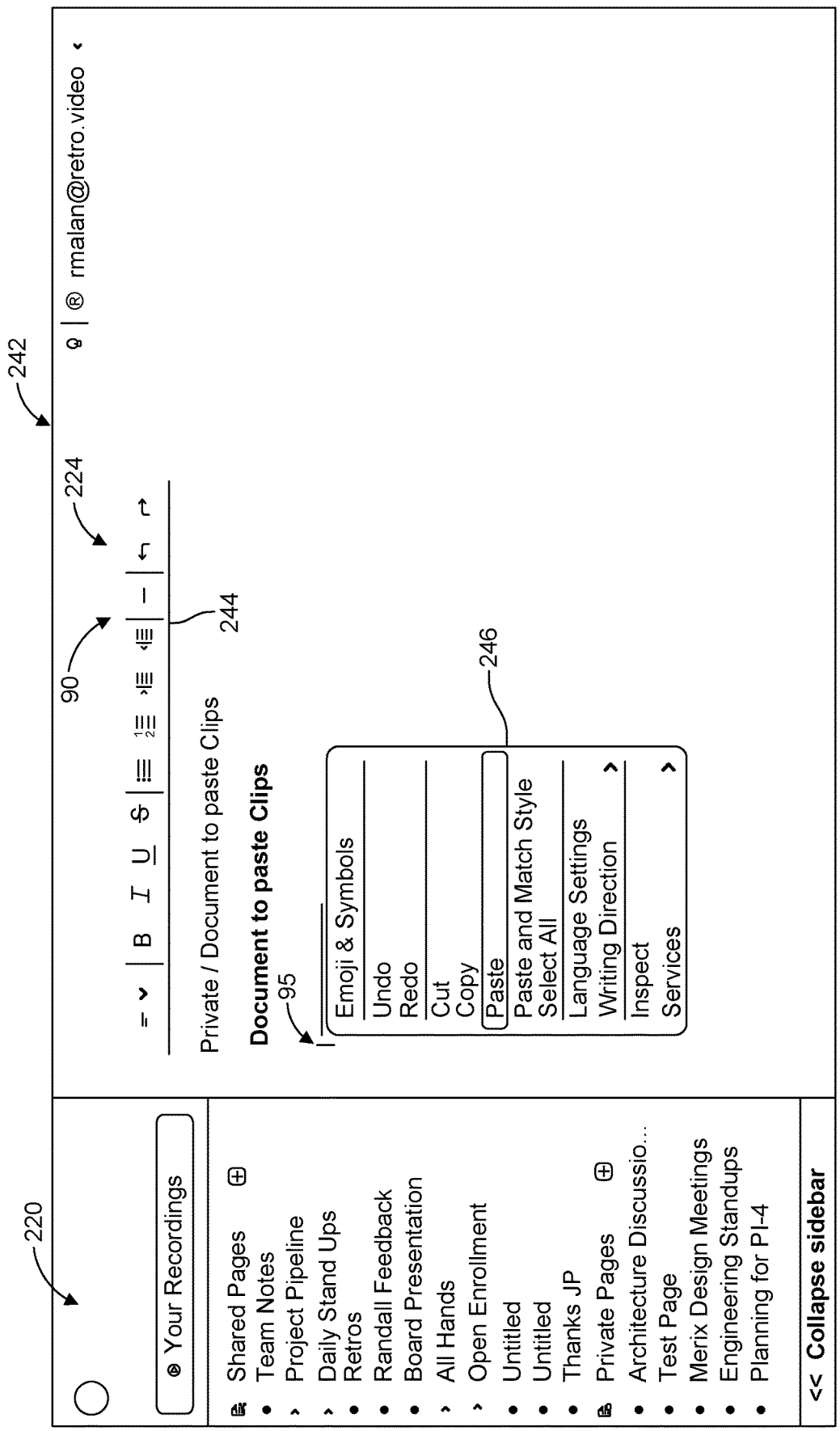
Figure 11C:
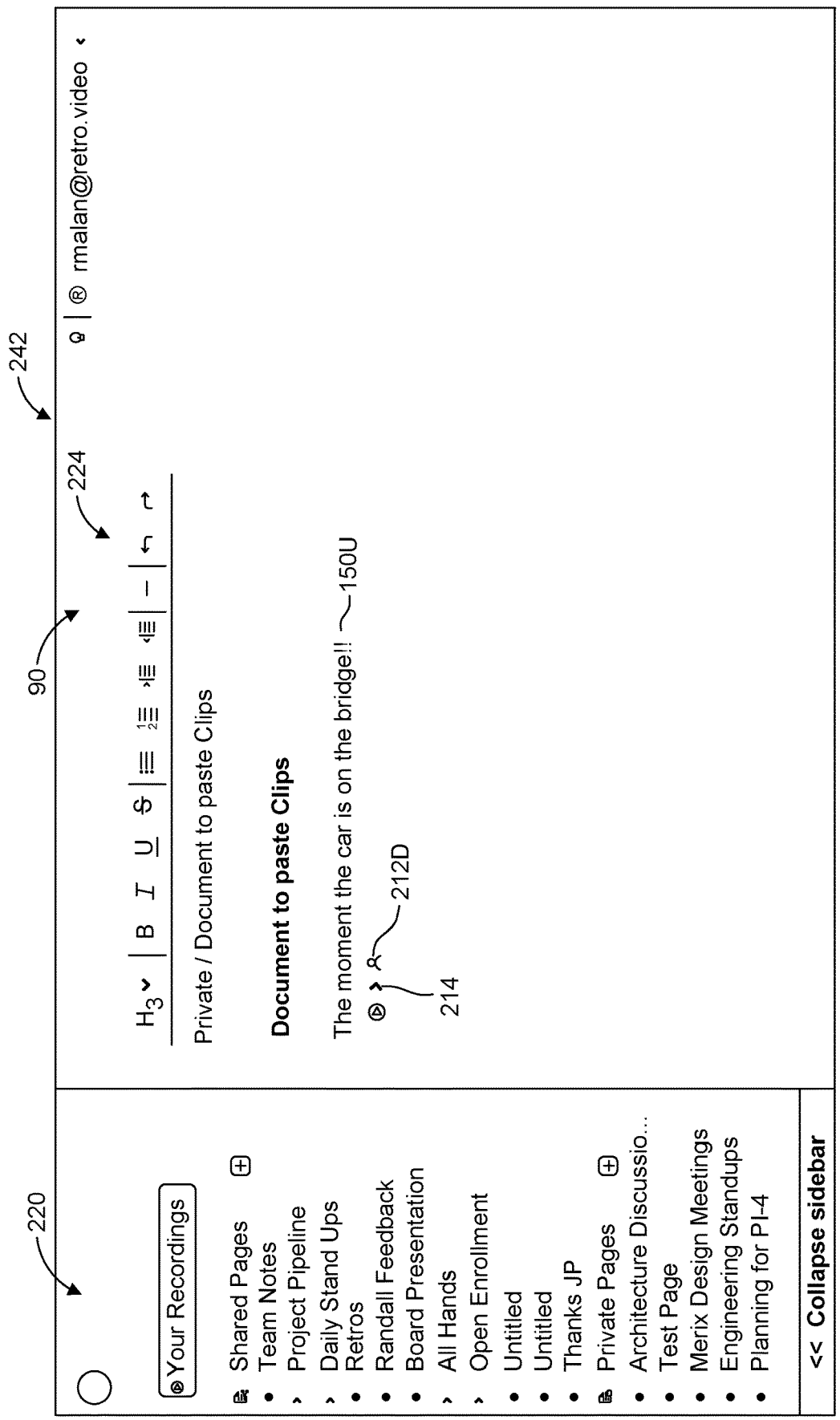

In general, FIGS. 11A-11C are illustrations of an exemplary page editor screen 242 of the GUI 87 rendered by the user app 85 and displayed on the display 86 of the user device 80. The page editor 90 is presented in the main display pane 224. The page editor includes the various display and interface elements described previously, including the text input box, the text formatting toolbar 244, and the cursor 95 indicating the current position for any incoming text input received by the user device.

In the example illustrated in FIG. 11A, a right click menu 246 is shown. The right click menu is displayed in response to the user app 85 detecting a predetermined input for generating the menu (e.g., detecting activation of a right button of a mouse input device). The right click menu includes a selectable paste option, for pasting copied contents into the text input box.

In FIG. 11B, the portion of the transcript text shown as selected in FIG. 10C has been copied and pasted (e.g., in response to selection of the paste option in the right click menu of FIG. 11A) into the page editor 90 at the position designated by the cursor in FIG. 11A. As a result, an embedded clip 212 is displayed in the form of a clip display element 212D presented as part of the contents of the page within the text input box of the page editor. As in the example discussed with respect to FIG. 1A, the clip display element 212D includes the transcript text 228T pertaining to the portion of the recording referenced by the embedded clip (which is the same as that copied from the transcript text of the recording screen in FIG. 10C). The clip display element 212D also includes the clip play button 94 and overlaid clip player 92. In addition, the clip display element also includes a collapse button 214.

The page can then continue to be edited and added to with content from other recordings or more pieces from the same recording. For example, when the recording is of a meeting, these will take the form of enumeration action items and summaries of clips pulling out the key parts of the meeting, to list a few examples.

In one embodiment, a user who has access to this page, but not the original recording, can also select parts of the clip and cut and paste into another new page, enabling a wide range of collaboration and powerful sharing capabilities.

In one example, if the user selects multiple objects in the page to copy such as the last few sentences of a clip's transcript, the following markup/plaintext, and then the first few sentences of a second clip (three objects total), all can be pasted into a new page via the page editor.

In FIG. 11C, the clip display element is collapsed in response to selection of the collapse button 214 which toggles the clip display element between an expanded state showing the transcript text 22T as shown in FIG. 11B and the collapsed state not showing the transcript text of FIG. 11C, resulting in the transcript text for the embedded clip being hidden and the collapse button being changed to an expand button, also shown in the user-authored context (text) 150U. In response to selection of the expand button, the user app displays the transcript text of the embedded clip again.

As demonstrated in examples illustrated in FIGS. 10A-11C, the presently disclosed media presentation system allows the user to share or present a portion of a full recording using the familiar and intuitive sequence of selecting, copying, and pasting text.

In general, FIGS. 12-16 illustrate exemplary iterations of page data for a page with embedded clips in its various forms as the page data is retrieved, parsed, authored, and presented by the user app.

Figure 12:
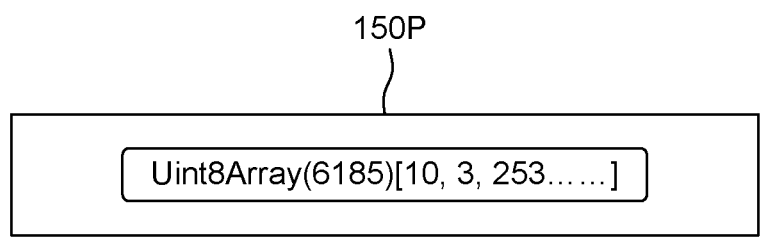

More particularly, FIG. 12, shows the page data 150P as it is stored in the data store(s) 114 of the server system 110 and retrieved by the user app 85. In the illustrated example, the stored/retrieved page data is a compressed 6185-byte array.

FIG. 13 shows the same page data 150P after it is decompressed by the user app 85.

FIG. 14 shows the same page data 150P after it is parsed by the user app and expanded into an XML document with JSON components indicating various display elements to be rendered along with a clip display element. In the illustrated example, the clip display element has various attributes, including an open boolean attribute set to false, a recording ID attribute indicating a recording ID for a unique recording object, an ID attribute indicating a clip ID, a page ID attribute indicating the page in which the clip object is embedded, a source clip ID indicating the clip ID of another clip from which the present clip was created (e.g., via copying and pasting transcript text presented in a clip display element for a clip embedded in a page), a source page ID attribute indicating the page in which the source clip was embedded, a raw start attribute indicating a raw start time offset value of 0, a raw end attribute indicating a raw end time offset value of 1032.133, and a view start attribute indicating a view start time offset value of 59.71.

Figure 15:
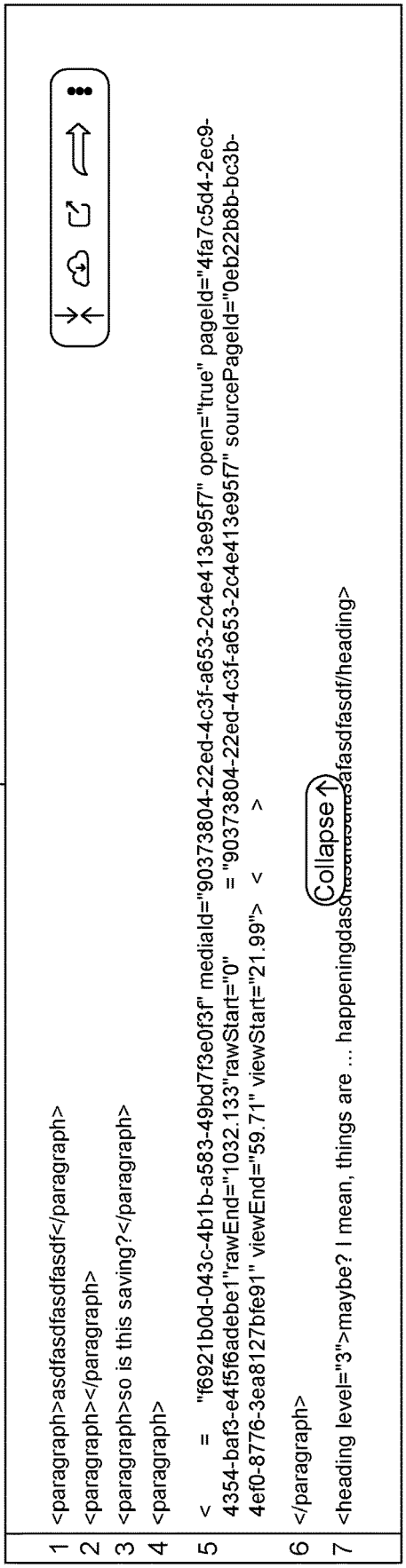

FIG. 15 shows the same page data 150P after it is parsed into page display data, including markup language for rendering the display elements that present the page contents. In the illustrated example, the JSON components indicating the various display elements have been parsed such that text contents of the page are tagged with markup tags <paragraph> and <heading> tags. At the same time, the JSON component corresponding to the clip object for the embedded clip has been parsed into a specially formatted clip reference string distinguished from the rest of the page contents using markup tags <clip>, which also indicate the attributes previously discussed with respect to FIG. 14.

Figure 16:
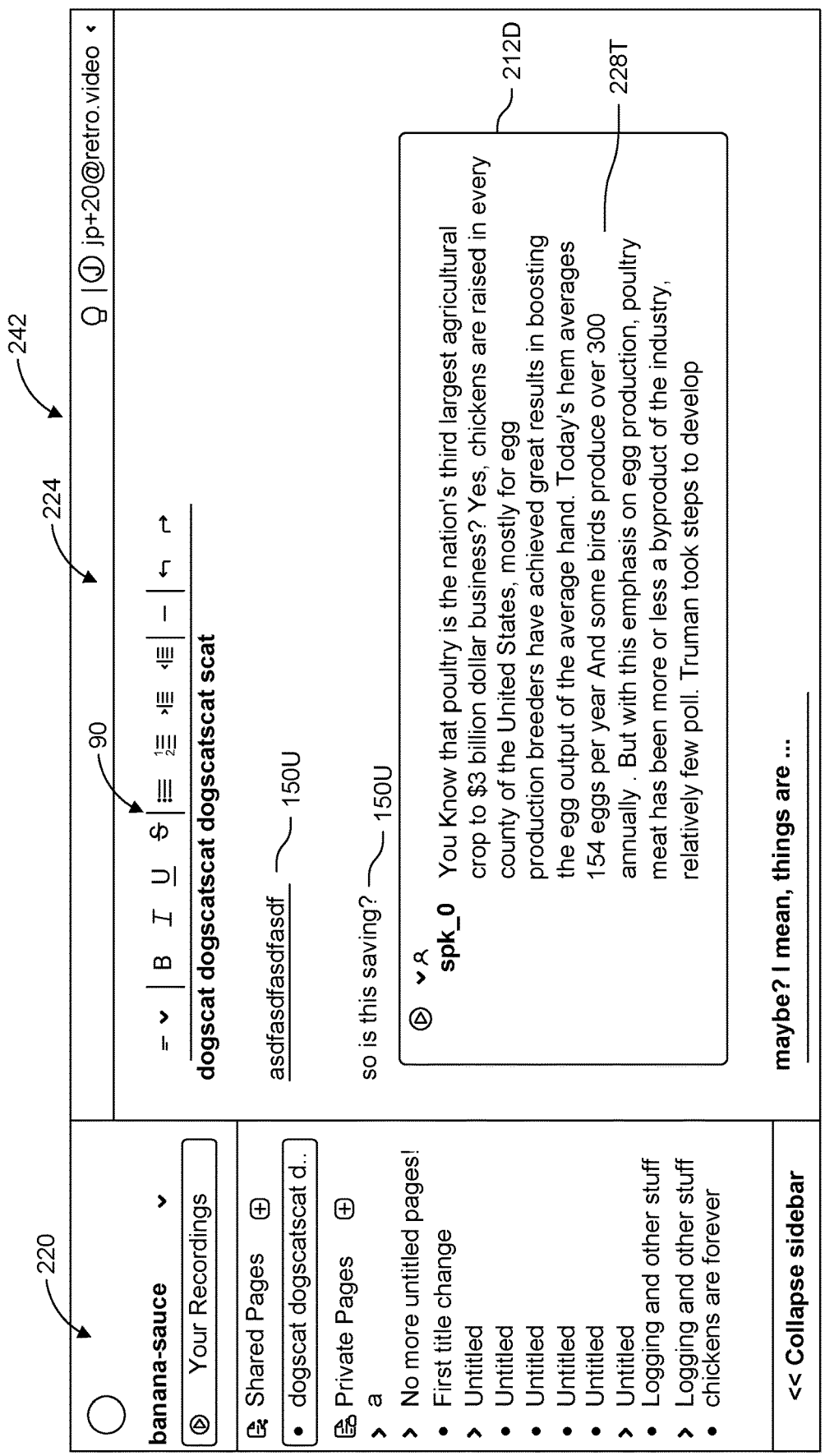

Finally, FIG. 16 shows the same page data after it is rendered by the user app and presented on the display as the page editor screen, including a clip display element 212U for the embedded clip based on the specially formatted clip reference string discussed with respect to FIG. 15. The clip display element is nested in surrounding user-authored content 150U.

Figure 17:
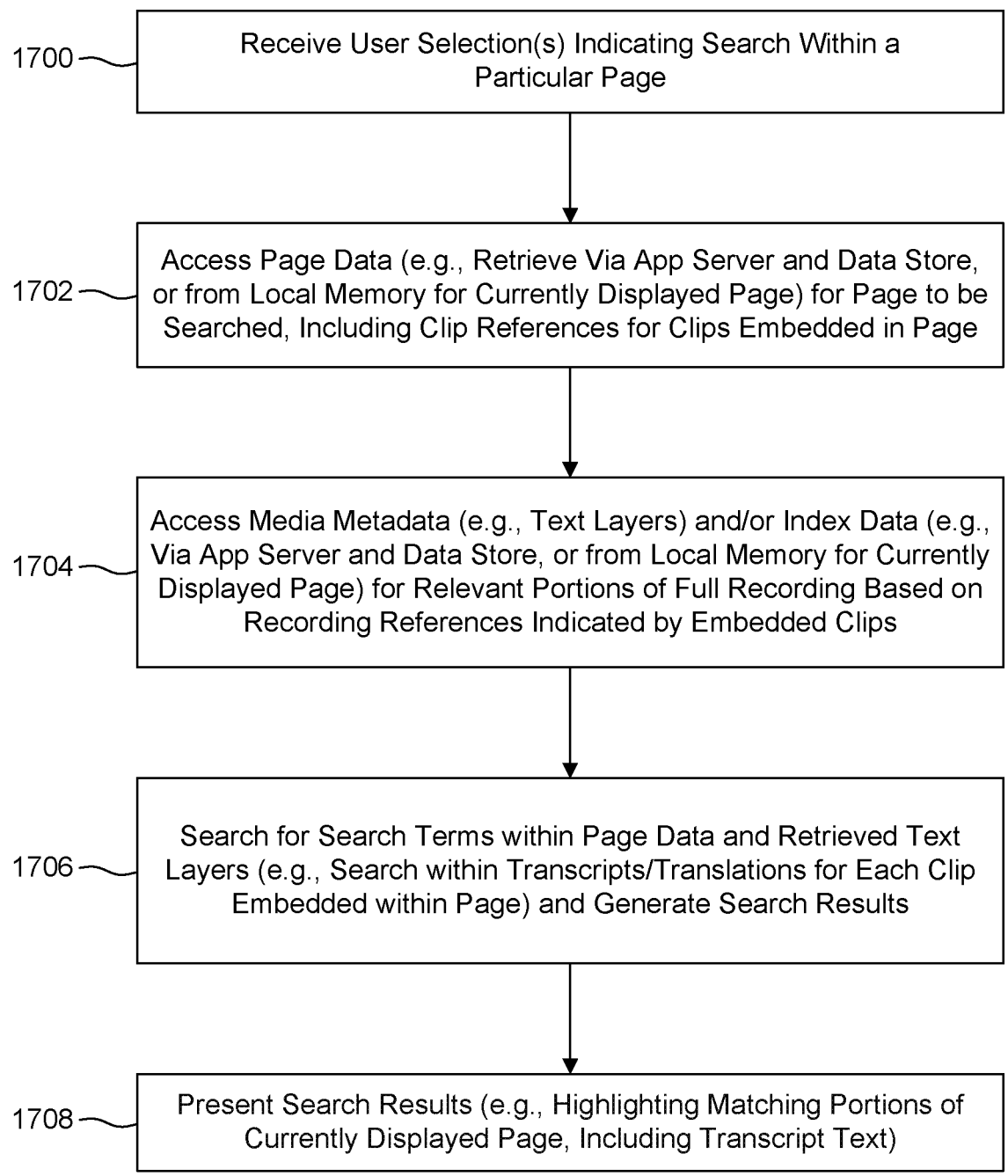
FIG. 17 is a flow diagram illustrating a process for searching within a page.

FIG. 17 is a flow diagram illustrating a process for searching within a page.

In step 1700, the user app provides a search interface for receiving user entered search terms and receives the search criteria from the user indicating a search to be performed with respect to contents of a particular page (e.g., including embedded clips).

In general, the user app 85 then searches for matches to the search terms by searching for the matches in user-authored content 150U of the pages and within text and transcription layers of the referenced portions, and presents search results including the user-authored content matching the search terms and with the text layers of the references portions.

For example, in step 1702, the user app accesses page data 150P for the page in question (e.g., by retrieving the page data via the app server and the datastore or simply by accessing page data for a currently displayed page in local memory of the user device), the accessed page data including clip references for clips 212 embedded in the page, and the layer encompassed by those clips including the transcript layer 271, the annotations layer 272, the chat layer 274, and the slides layer 278.

In step 1704, the user app accesses media data (e.g., text and transcription layers of the portions of the recording object data 210 referenced by clips in the page) and/or index data (e.g., via the app server and datastore or from local memory) for relevant portions of the full recording based on recording references and/or clip references included in the page data 150P for the embedded clips.

In step 1706, the user app 85 performs the search by searching for search terms within the accessed page data including the user-authored content 150U and within the accessed media data text layers including the transcript layer 271, the annotations layer 272, the chat layer 274, and the slides or screenshare layer 278 pertaining to the embedded clips. For example, the user app searches within transcripts and/or translations for each clip embedded within the page. At the same time, the user app 85 does not provide hits to the search terms for the portions of the recording object data 210 that are not referenced by clips in the page.

In step 1708, the results of the search performed in step 1706 are presented, for example, by highlighting in a particular color matching portions not just of the contents of a currently displayed page (or preview text of a page that is not currently displayed) but also of any transcript and/or translation text pertaining to any clips embedded within the page.

In general, FIGS. 18-23 are illustrations of exemplary page editor screens of the GUI rendered by the user app and displayed on the display of the user device, showing various iterations of the screens at different stages of the search process discussed with respect to FIG. 17.

Figure 18:
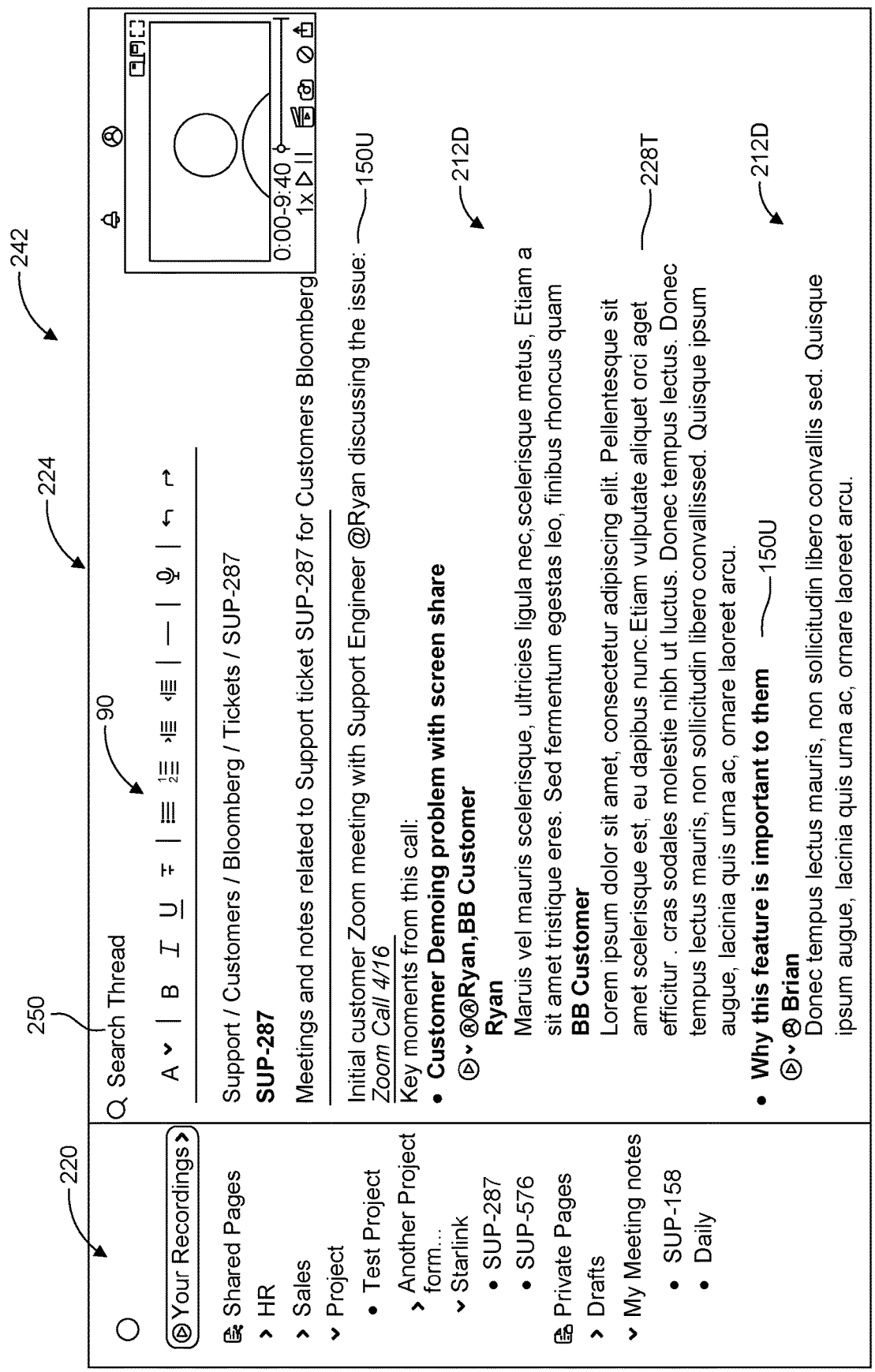

More particularly, FIG. 18 shows the page editor screen with the page editor presenting a page that contains both user-supplied text 150U and embedded clip display elements 212D.

Figure 19:
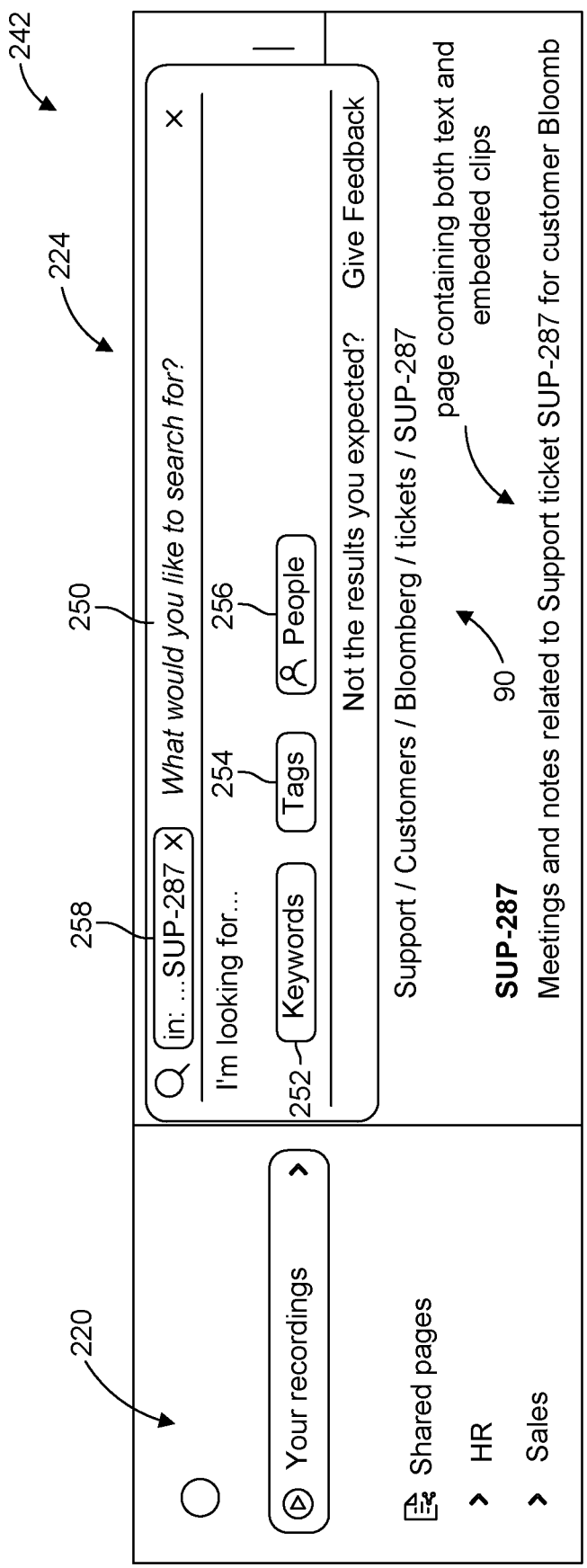

FIG. 19 shows the page editor screen 242 of FIG. 18 and specifically highlighting a page search bar 250. The page search bar 250 is text input box populated with a page indicator 258 (e.g., in response to user input indicating search specifically within the page), which indicates that any search will be conducted with respect to the page identified in the page indicator. The page search bar also includes selector buttons 252 for adding additional indicators to the page search bar further narrowing the search criteria such as for tags 254 and users 256.

Figure 20:
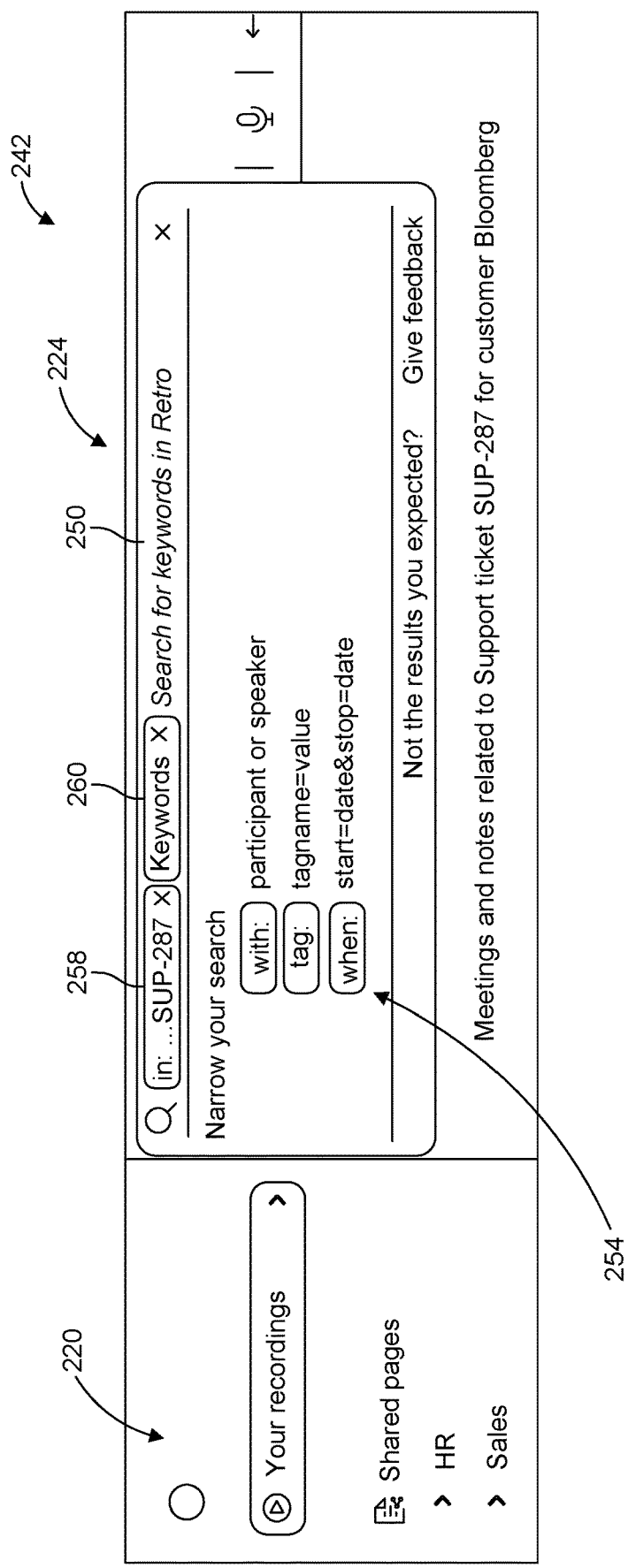

FIG. 20 shows the page editor screen 242 with the page search bar of FIG. 19, additionally including a keyword activation indicator 260 indicating that user input entered by the user for the search will specifically be interpreted as targeting keywords associated with the page data, clip data, and/or media data.

FIG. 21 shows a page editor screen 242 similar to that discussed with respect to FIGS. 18-20. Now, however, a search term for searching the currently displayed page has been entered in the search bar, and the page editor displays the page with text matching the entered search term highlighted in a particular color not just within the user-supplied text of the page but also within the transcript text for all of the embedded clips of the clip display elements 212D and user-authored text content 150U within the page.

FIG. 22 shows a page editor screen 242 similar to that discussed with respect to FIG. 21. Now, however, the search is conducted using a built-in searching feature 250B of a browser 262 within which the user app 85 executes. As before, in response to the search using the built-in browser search feature, the page editor displays the page with text matching the entered search term highlighted in a particular color not just within the user-supplied text of the user-authored text content 150U of the page but also within the transcript text for all of the embedded clips of the clip display elements 212D within the page.

Figure 23:
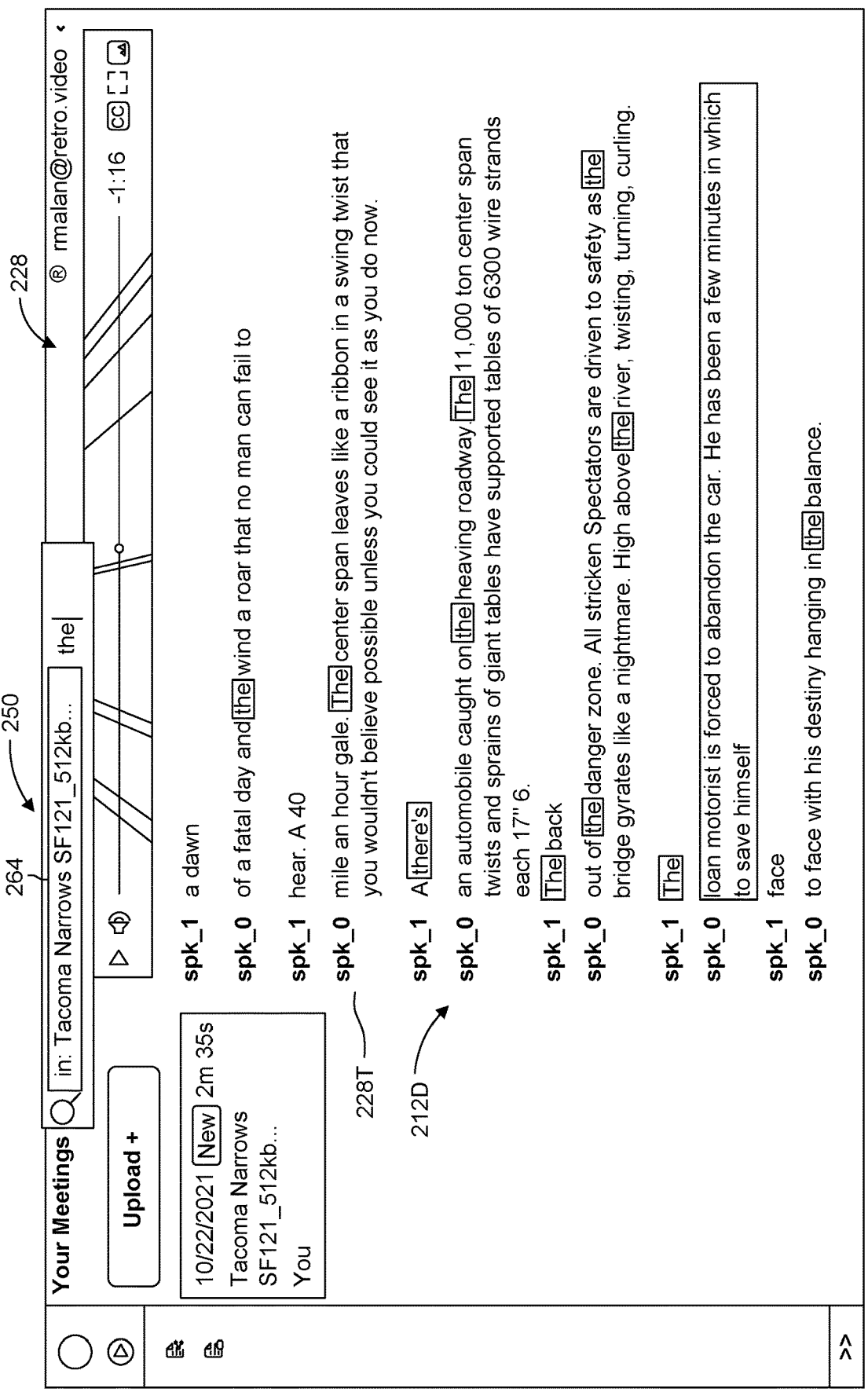

FIG. 23 shows a recording screen 228 similar to that previously described with respect to FIG. 4. The recording screen includes a search bar 250 populated with a search term and an indicator similar to that previously described with respect to FIGS. 19-21. Now, however, instead of a page indicator, it is a recording indicator 264 indicating that the search was conducted with respect to a particular recording. In response to the search within the recording, the recording screen displays the transcript text 228T of the recording with text matching the entered search term highlighted in a particular color.

Figure 24:
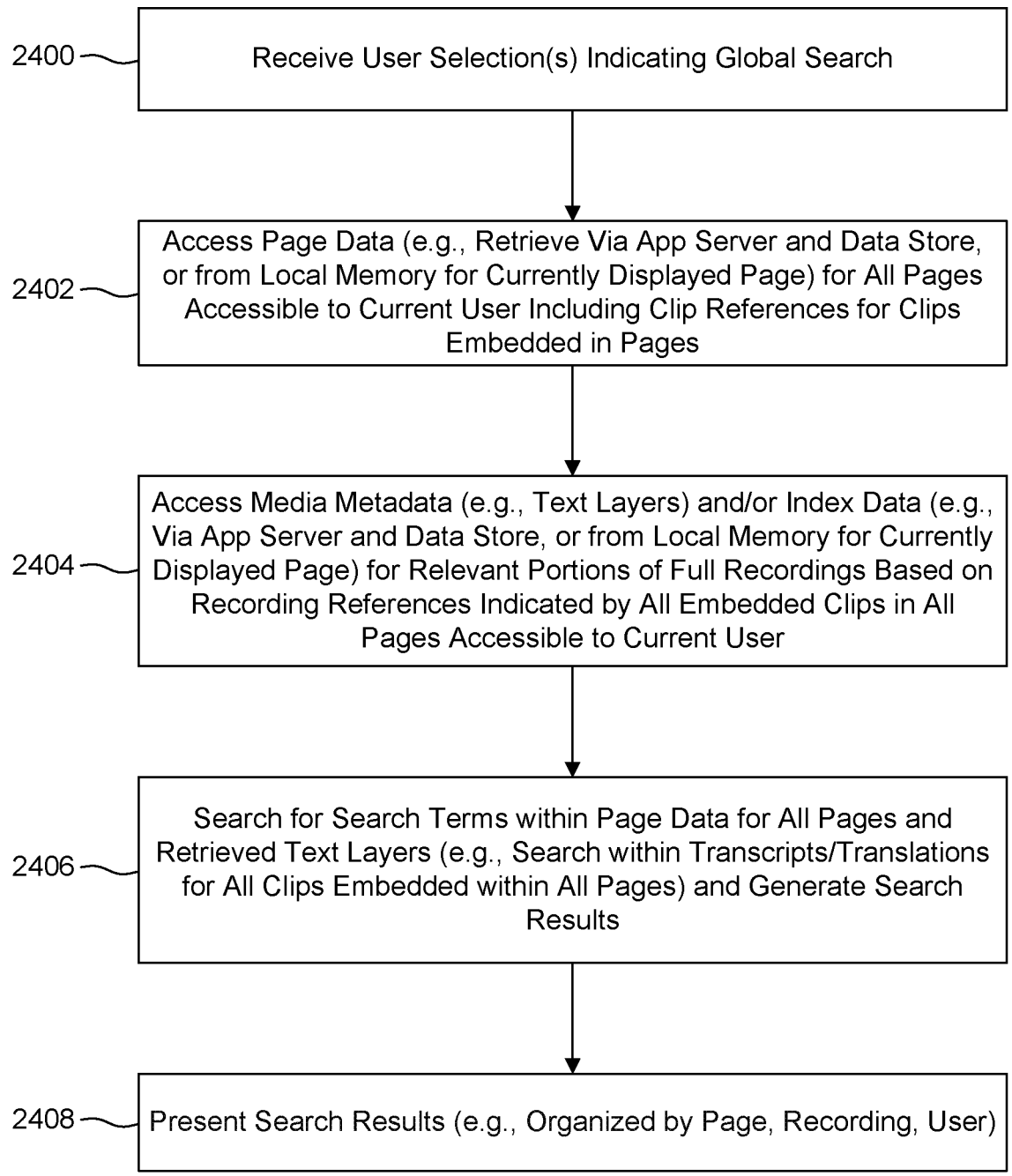
FIG. 24 is a flow diagram illustrating a process for searching globally.

FIG. 24 is a flow diagram illustrating a process for searching globally, for example, within all pages (and all clips embedded in all pages), recordings, workspaces, and/or users accessible to the current user.

In step 2400, the user app 85 receives selections from the user indicating a global search.

In step 2402, the user app accesses page data 150P for all pages accessible to the current user (e.g., by retrieving the page data via the app server and the data store), the accessed page data including clip references for any clips embedded in the pages.

In step 2404, the user app accesses media data (e.g., text layers) and/or index data via the app server and data store for all recordings accessible to the current user and any portions of recordings referenced by clips embedded in all pages accessible to current user.

In step 2406, the user app performs the search by searching for search terms within the accessed page data and within the accessed media data text layers and generates global search results.

In step 2408, the user app presents the results of the search performed in step 2406, for example, organizing the global search results by page, recording, and/or by user.

Figure 25:
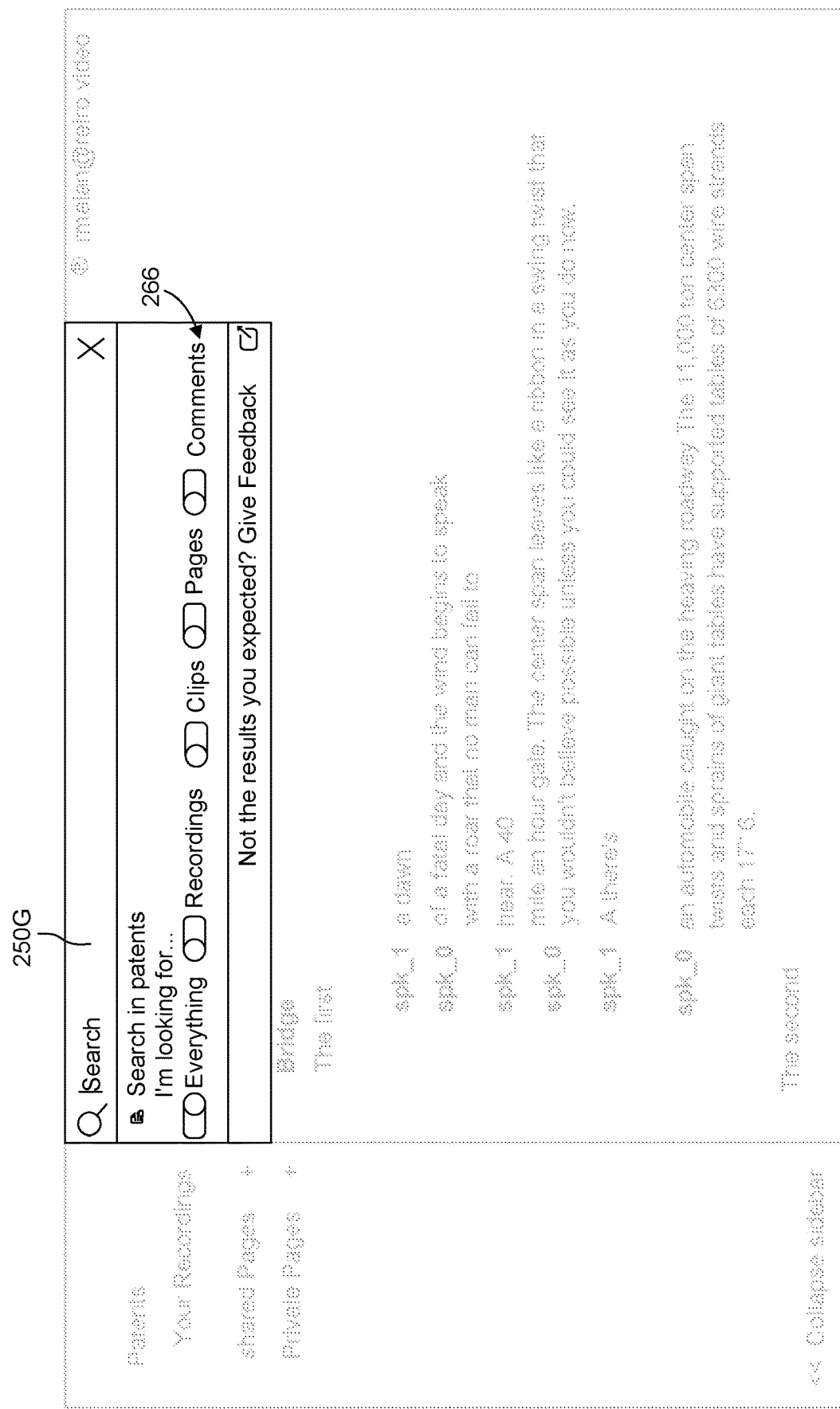
FIG. 25 shows an exemplary global search pane of the GUI.

FIG. 25 is an illustration of an exemplary global search pane 250G of the GUI rendered by the user app and displayed on the display of the user device 80. In the illustrated example, the global search pane expands from the search bar at the top of the page editor screen (e.g., in response to user selection of the search bar) and is overlaid on an exemplary page editor screen. The global search pane includes search criteria selectors 266 for broadening or narrowing the search by criteria by including or excluding recordings, clips, pages, and/or comments from the global search.

Figure 26:
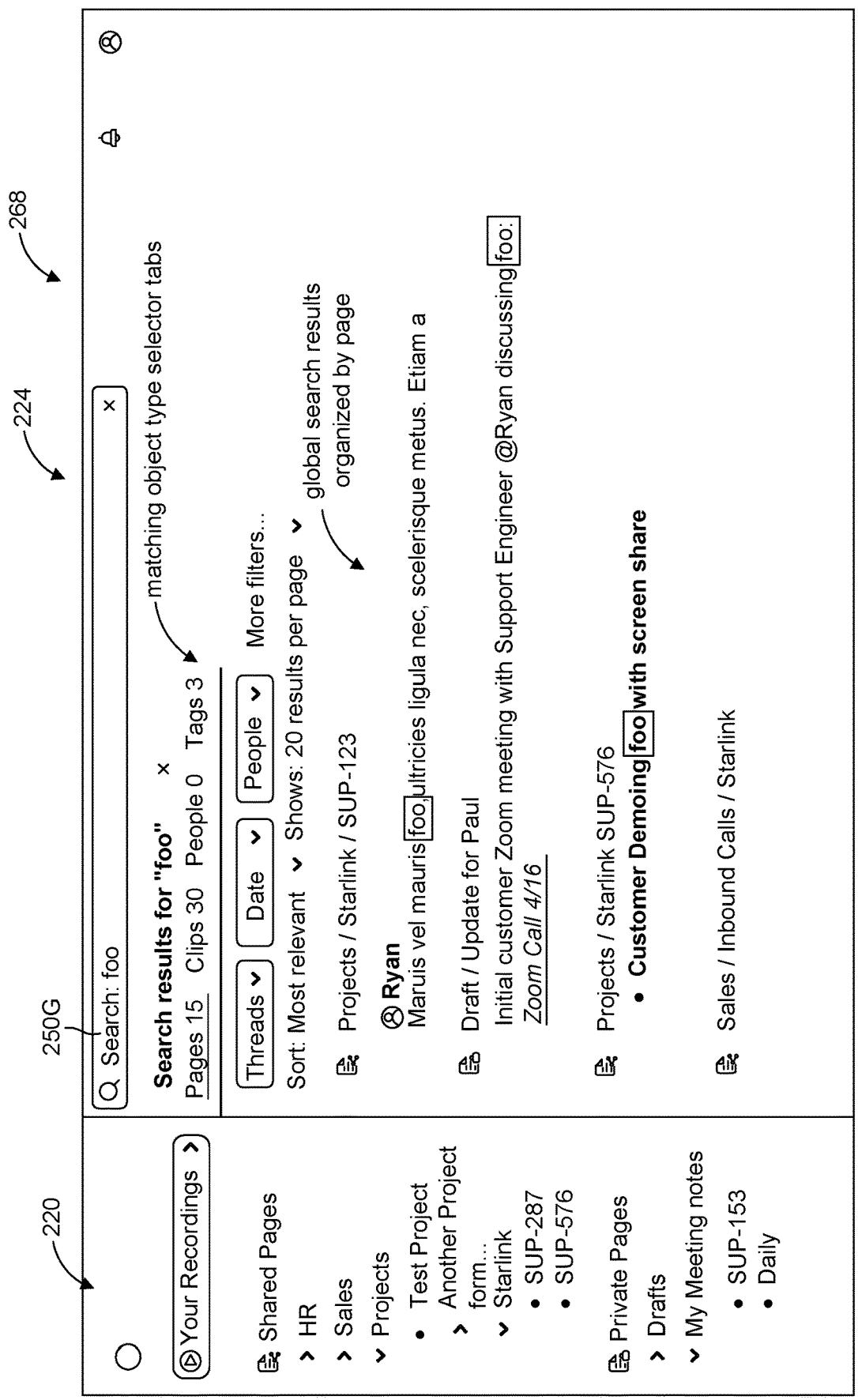
FIG. 26 shows an exemplary global search results screen of the GUI.

FIG. 26 is an illustration of an exemplary global search results screen 268 of the GUI rendered by the user app 85 and displayed on the display of the user device 80. The global search results screen 268 presents the results of the global search in the main display pane organized by page and includes matching object type selector tabs for changing the display of the global search results to be organized by moments, people, or tags.

Figure 27:
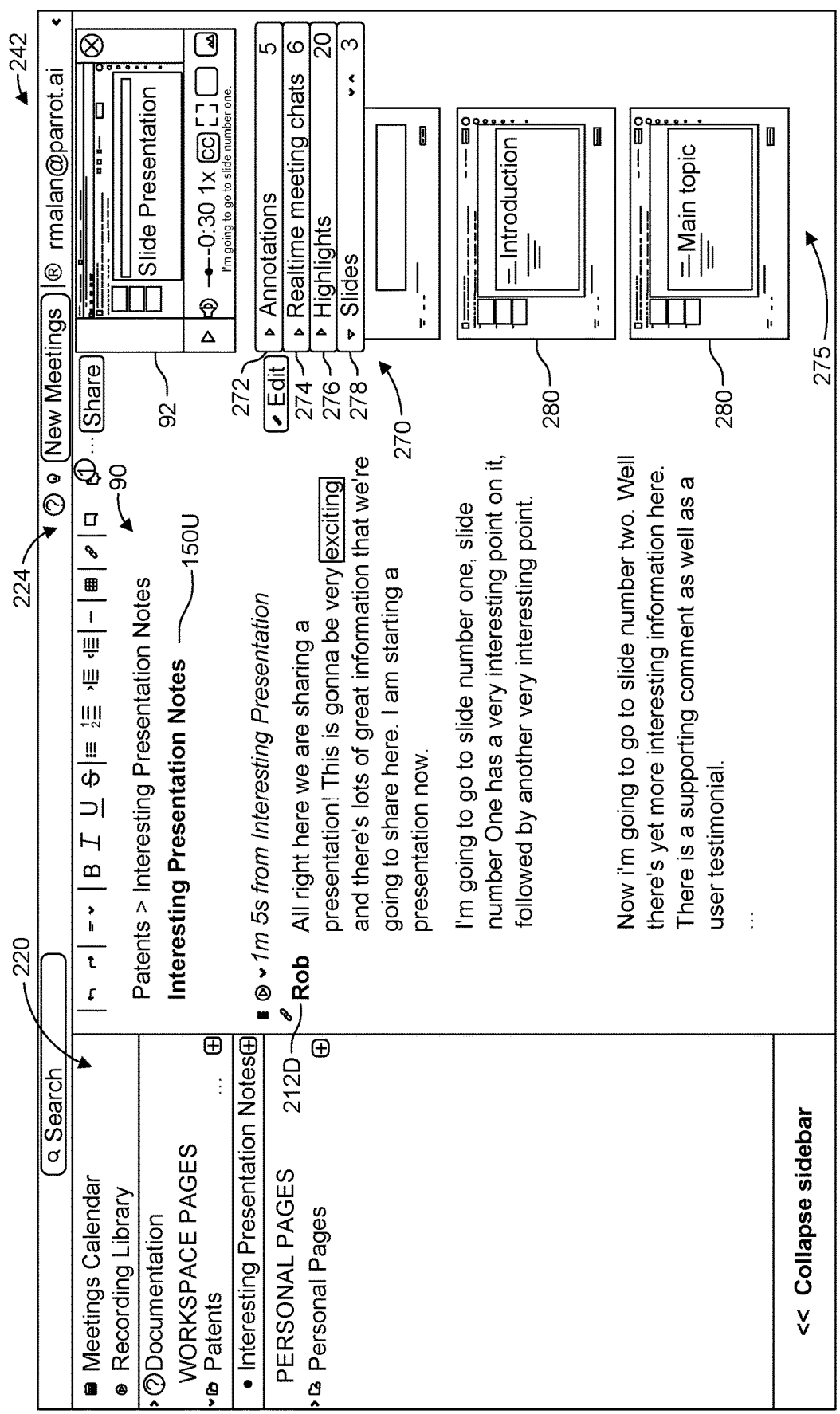
FIG. 27 shows an exemplary page editor screen of the GUI with an additional layers pane.

FIG. 27 shows an exemplary page editor screen 242 of the GUI 87 rendered by the user app 85 and displayed on the display 86 of the user device 80. As previously described, the page editor 90 is presented in the main display pane 224, which is here illustrating the transcript text from the transcript layer 271 presented in the clip display element 212D. The page editor includes the various display and interface elements described previously, including the text input box, the text formatting toolbar.

The page editor screen 242 in this example further includes an additional layers pane 275 in which addition layers of the clip are accessed and displayed. In the illustrated example, this pane enables the display of different time-indexed content layers of the sample clip that corresponds to clip display element 212D such as for audio, video, text, and/or metadata content, including translations, speakers, and tags, among other examples, beyond the transcript layer 271 information presented in the clip display elements 212D presented in the main display pane 224.

In the illustrated example, there are five selectable tabs corresponding to the annotations layer 272, chats layer 274, highlights layer 276, and slides layer 278. Here, the slides layer 278 is expanded showing the slides from the time-indexed content layers that correspond the displayed transcript text and is part of the clip associated with the illustrated clip display element 212D. Specifically, several slides 280 are shown.

Figure 28:
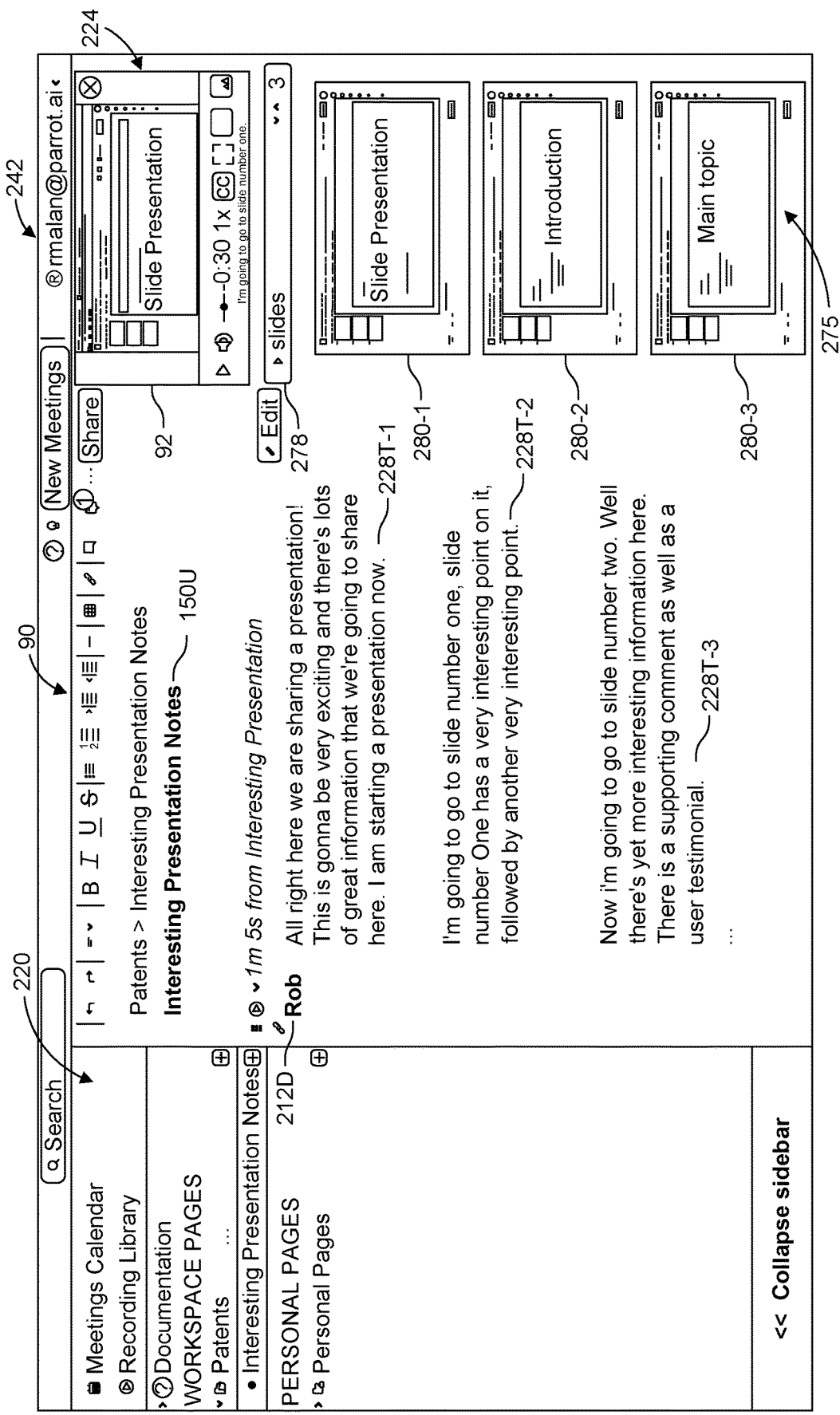
FIG. 28 shows an exemplary page editor screen of the GUI with a slides layer pane.

FIG. 28 shows an exemplary page editor screen 242 of the GUI with only the slides layer shown in the additional layers pane 275. The slides 280 are preferably displayed on a common time-index with the transcript text 228T with time increasing in the direction of the page's length. Specifically, transcript text excerpt 228T-1 corresponds in time and was spoken with slide 280-1 was displayed in the meeting. Likewise, transcript text excerpt 228T-2 corresponds in time and was spoken when slide 280-2 was displayed, and transcript text excerpt 228T-3 corresponds in time and was spoken when slide 280-3 was displayed in the meeting.

Figure 29:
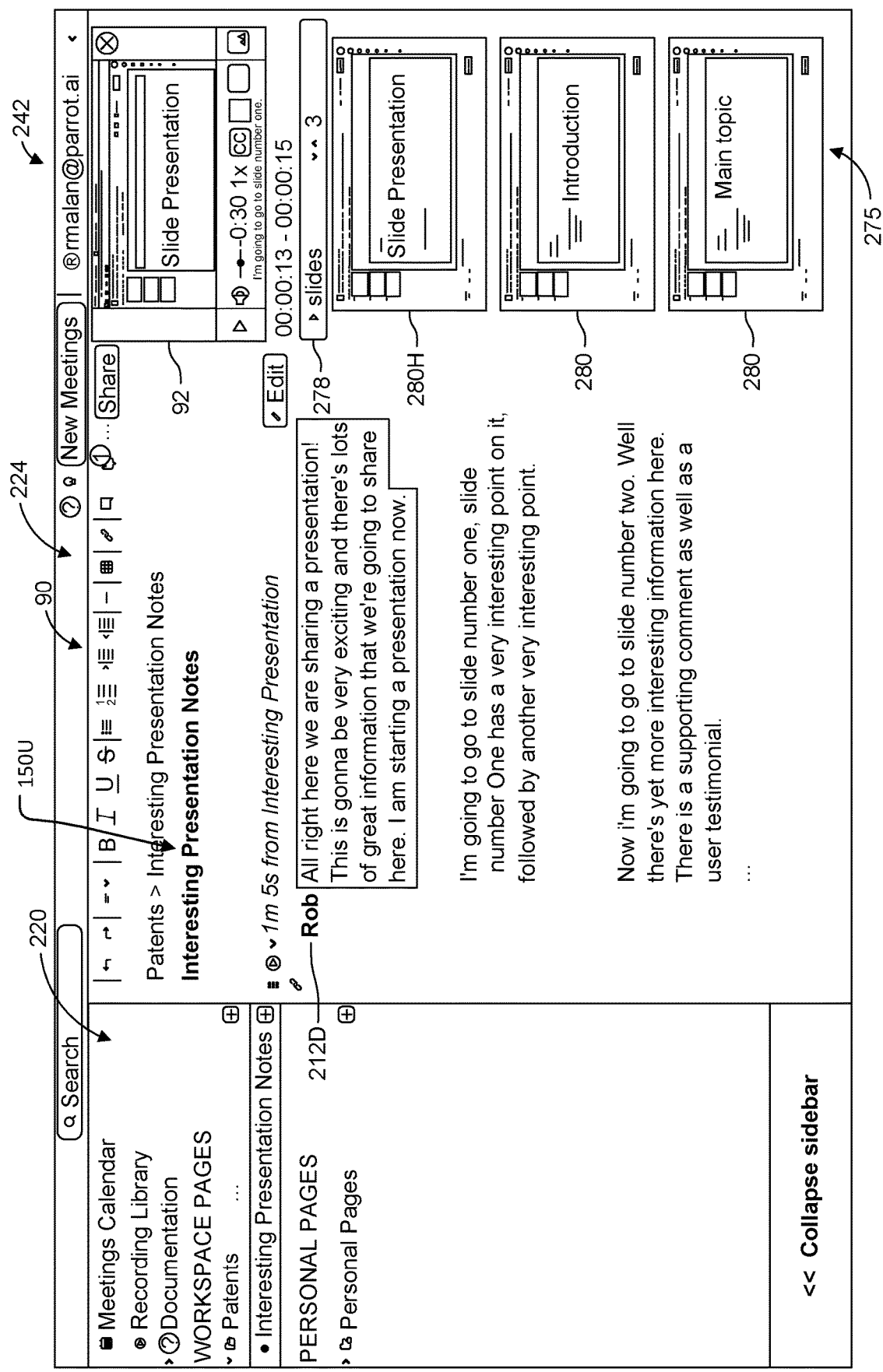
FIG. 29 shows an exemplary page editor screen of the GUI showing how highlighting text in the transcript of the clip cause the emphasis of the slide that was displayed when that portion of the transcript was recorded.

FIG. 29 shows an exemplary page editor screen 242 of the GUI showing how the user can highlight particular text 290 from the transcript layer 271 shown in the clip display element 212D. In response to this action, the GUI 87 rendered by the user app 85 and displayed on the display 86 emphasizes or highlights the particular slide 280H that was being displayed when the corresponding text was spoken and recorded during the event.

Figure 30:
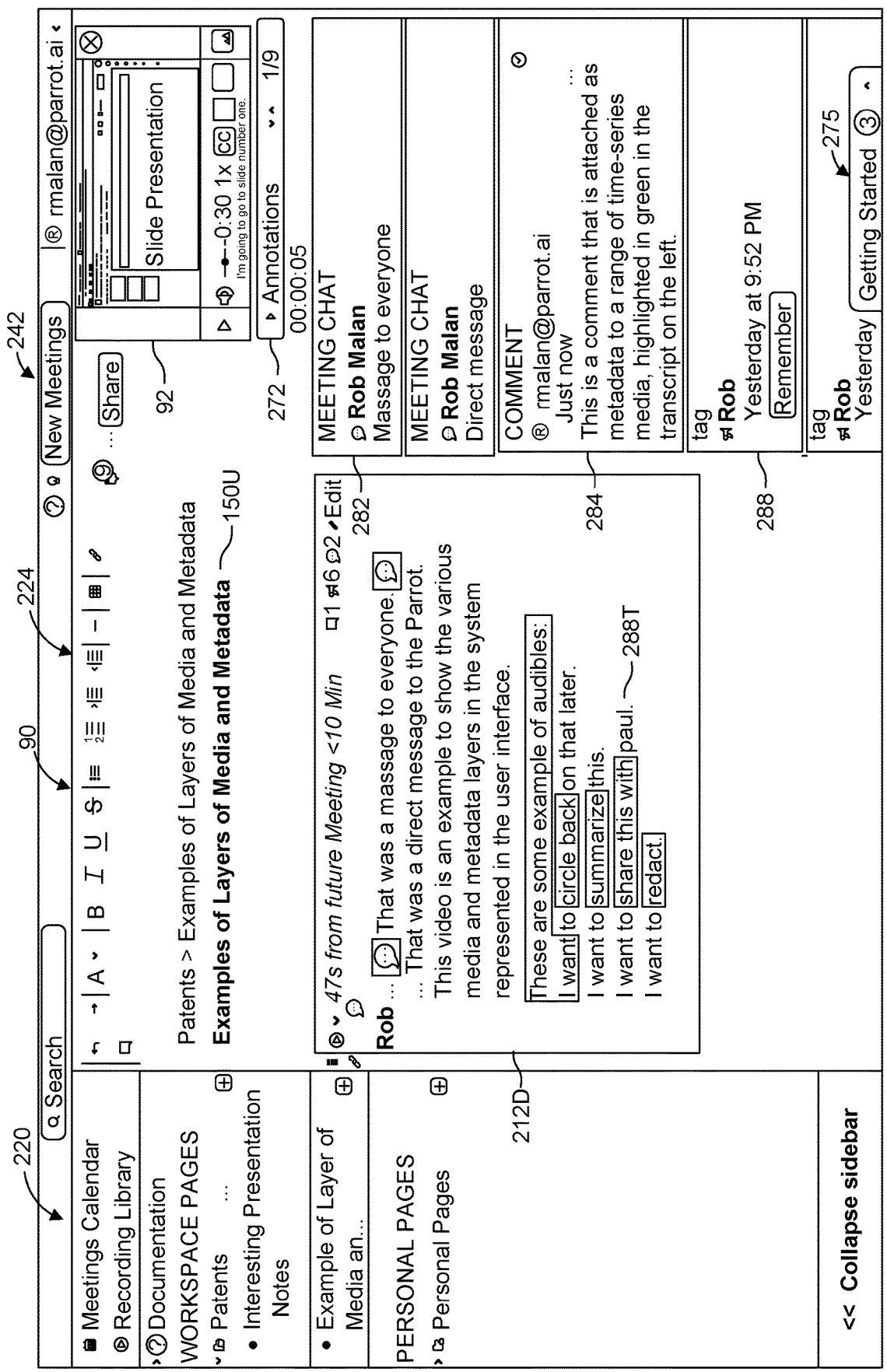
FIG. 30 shows an exemplary page editor screen of the GUI with an annotation layer pane.

FIG. 30 shows an exemplary page editor screen 242 of the GUI showing how the annotation layer 272 is displayed in the additional layers pane 275. Here a comment 284 is displayed along with an index information such as tags 288.

Figure 31:
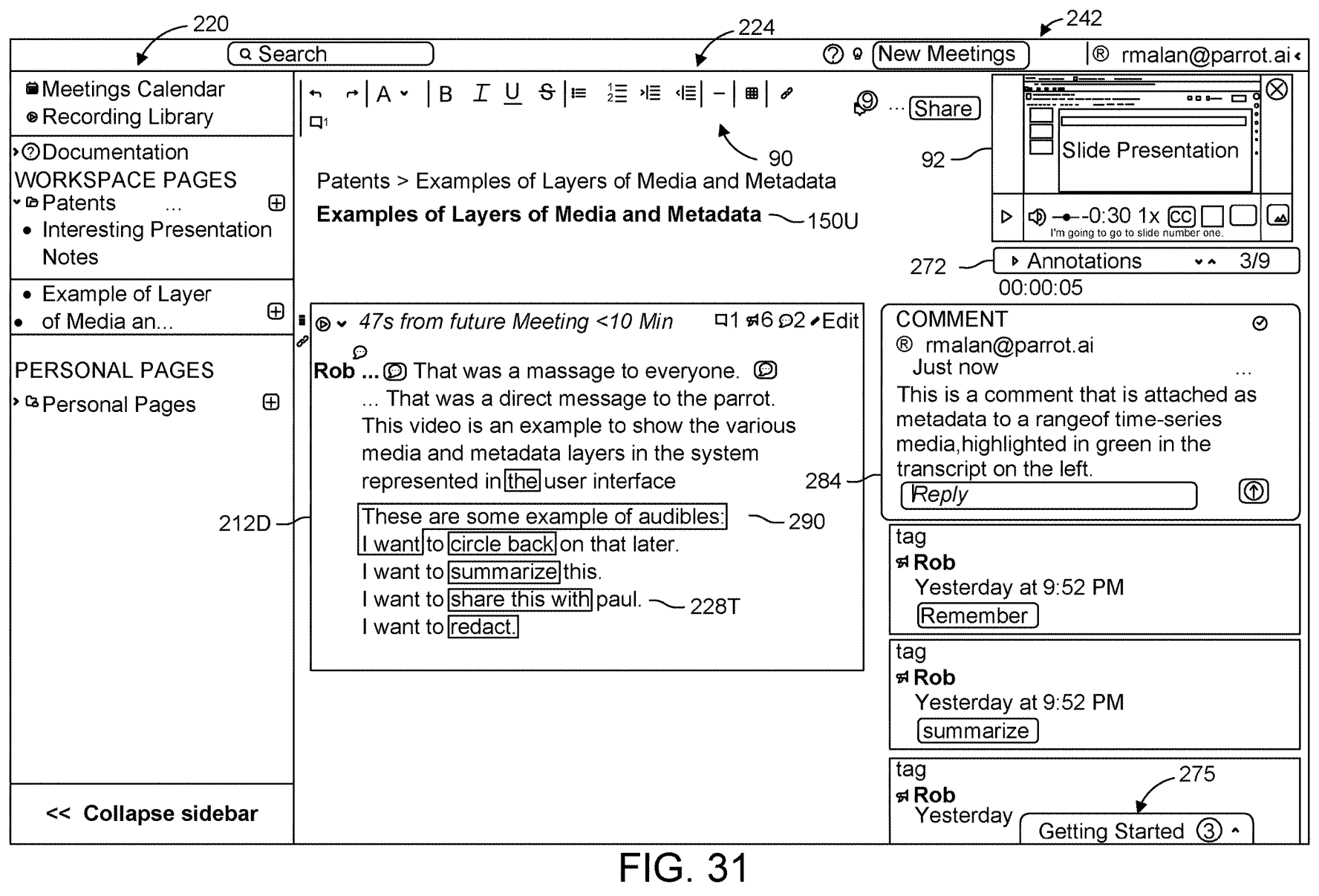

FIG. 31 shows an exemplary page editor screen 242 of the GUI with the annotation layer 272 displayed in the additional layers pane 275. Here a comment 284 is shown as being emphasized, associated with a delineated portion of the transcript 290, showing how the time correspondence between the different layers is indicated on the display.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for documenting events, the method comprising:
    generating a graphical user interface that enables a user to author and edit multimedia documents including embedding reference data defining referenced portions (clips) of time-indexed content from the events into user-specified locations on pages of the documents, the time-indexed content including a transcript text layer providing a transcript of speech in the time-indexed content;
    maintaining the documents in a server system;
    retrieving at least one of the documents from the server system and displaying the retrieved document(s) to users with access to the retrieved document(s); and
    enabling the users to selectively display transcript text corresponding to the referenced portions,
    wherein a clip's reference data are stored with the pages in which they are embedded, and
    wherein when a page with embedded clips is searched any piece of any layer of any embedded clip matching the search, except for layers that are excluded based on user-specified search parameters, will be found and represented in the search results.

2. The method of claim 1, further comprising enabling the users to selectively display presentations and/or other layers of the time-indexed content corresponding to the clips.

3. The method of claim 1, wherein the time-indexed content further includes layers including comments, tags, notes, and chats.

4. The method of claim 1, wherein the events are video conferences, classes, meetings, presentations, conferences, and existing video.

5. The method of claim 1, wherein video conference events are stored in realtime or uploaded.

6. The method of claim 1, wherein the time-indexed content includes multiple video and audio layers representing different levels of quality for adaptive streaming.

7. The method of claim 1, wherein the time-indexed content is partitioned into smaller segments, each of a fixed duration.

8. The method of claim 1, wherein transcript text corresponding to the references portions is collapsible to hide the transcript text.

9. The method of claim 1, wherein the different layers are displayed in different columns.

10. The method of claim 1, wherein the different columns are displayed on a common time-index with time increasing in a direction of a page's length.

11. The method of claim 1, wherein the embedded clips are displayed with associated play buttons to playback the referenced portions in a player.

12. A system comprising user devices for displaying the graphical user interface and the server system for ingesting and storing the time-indexed content, the user devices and server system implementing the method of claim 1.

13. The method of claim 1, further comprising enabling the users to selectively search among any one of an annotations layer, a chats layer, a highlights layer, and a slides layer 278.

14. The method of claim 1, further comprising displaying slides on a common time-index with the transcript text.

15. The method of claim 14, wherein time increases in a direction of a length of the pages.

16. The method of claim 15, wherein the transcript text that was spoken when a slide was displayed is displayed next to that slide.

* * * * *